(12) United States Patent
Tulskie, Jr. et al.

(10) Patent No.: US 6,249,768 B1
(45) Date of Patent: Jun. 19, 2001

(54) STRATEGIC CAPABILITY NETWORKS

(75) Inventors: William A. Tulskie, Jr., Shrub Oak; Sugato Bagchi, White Plains, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/181,660

(22) Filed: Oct. 29, 1998

(51) Int. Cl.[7] .................................................. G06F 17/60
(52) U.S. Cl. ............................................ 705/7; 364/528.01
(58) Field of Search .................................................. 705/7

(56) References Cited

U.S. PATENT DOCUMENTS

| | | | |
|---|---|---|---|
| 4,894,773 | * | 1/1990 | Lagarias ..................................... 705/7 |
| 5,016,170 | * | 5/1991 | Pollalis et al. ............................. 705/7 |
| 5,172,313 | * | 12/1992 | Schumacher .............................. 705/7 |
| 5,321,605 | * | 6/1994 | Chapman et al. ......................... 705/7 |
| 5,521,814 | * | 5/1996 | Teran et al. ...................... 364/528.01 |
| 5,586,021 | * | 12/1996 | Fargher et al. .................. 364/468.06 |
| 5,675,745 | * | 10/1997 | Oku et al. .................................. 705/7 |
| 5,737,727 | * | 4/1998 | Lehmann et al. ......................... 705/7 |
| 5,832,455 | * | 11/1998 | Hayashi et al. ........................... 705/7 |
| 5,890,133 | * | 3/1999 | Ernst ......................................... 705/7 |

FOREIGN PATENT DOCUMENTS

WO 98/16893 * 9/1998 (WO) ....................................... 705/7
WO 99/67719 * 12/1999 (WO) ....................................... 705/7

OTHER PUBLICATIONS

Information Today—v11—N6–p 1–2–Jun. 1994 "OMI Acquistion Information Store".*
Busivhe Wire—Apr. 7, 1997 P0407100 "Premanc chucer An F–Warner Patos".*
Link–Up v13n1 pp 16–17 Jan./Feb. 1996 (UMI)–University Microfilms–R. Basch.*
Modern Healthcare 30, 48 May 29, 2000–Transformation in Small Doses–Deanna Bellandi.*

* cited by examiner

*Primary Examiner*—V. Millin
*Assistant Examiner*—Geoffrey Akers
(74) *Attorney, Agent, or Firm*—McGuireWoods; Stephen C. Kaufman

(57) ABSTRACT

An integrated framework is disclosed for analyzing a firm in terms of its resources, capabilities and strategic positions, providing a Strategic Capability Network composed of nodes signifying these resources, capabilities and strategic positions, together with relationships between these nodes. The framework provides for assessment of the costs of supporting resources and the value of strategic positions, and the propagation of costs to supported capabilities and strategic positions, and the propagation of value to supporting capabilities and resources. Provision is made for various types of synergetic relationships, with corresponding logical and or connections.

10 Claims, 11 Drawing Sheets

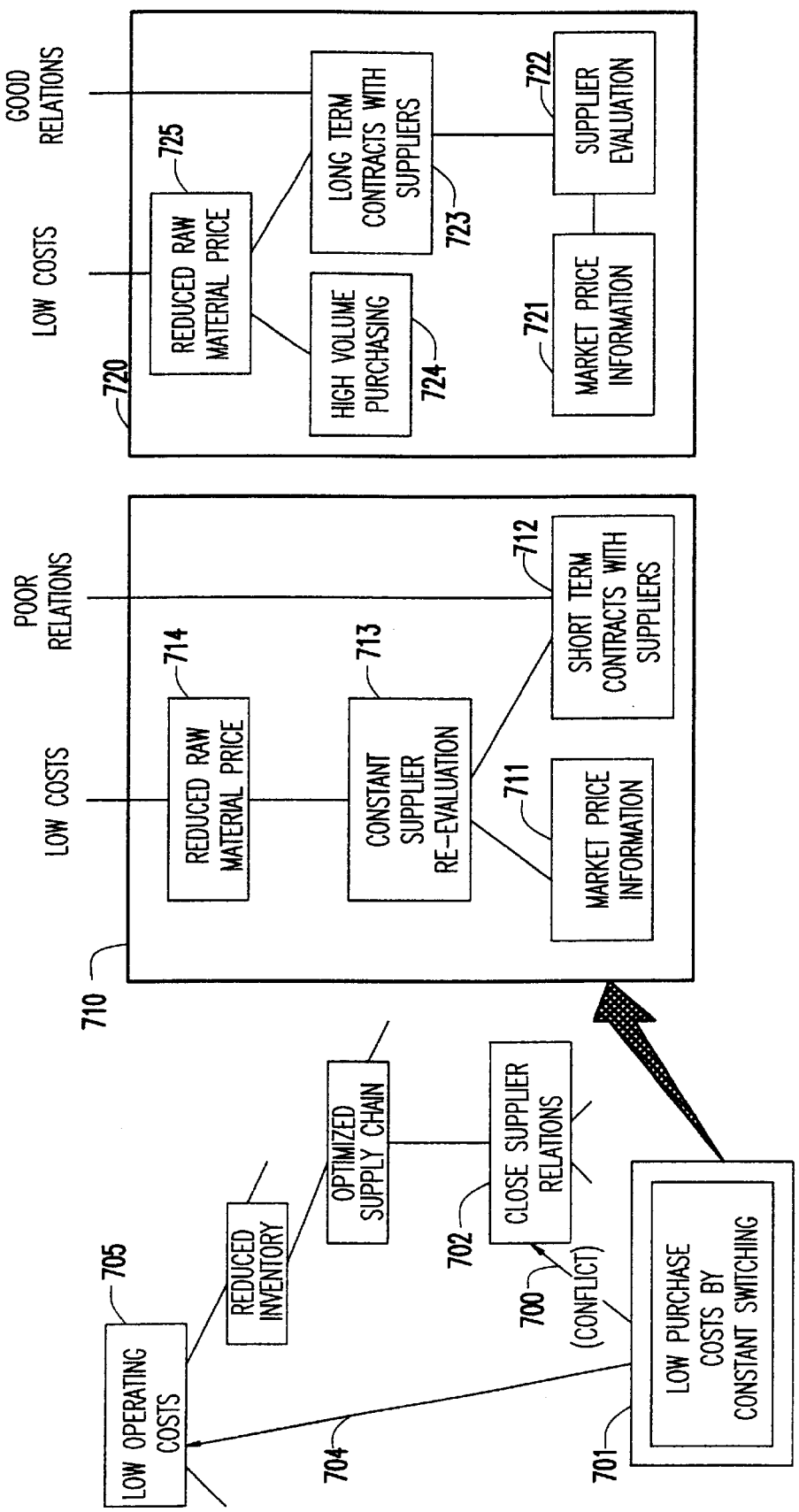

STRATEGIC CAPABILITY NETWORKS

BACKGROUND OF THE INVENTION

1. Field of the Invention

The present invention generally relates to strategic decision making, and in particular to the development of frameworks for modeling relationships between the core capabilities of a firm.

2. Background Description

A survey of business strategy research reveals a rich body of literature that describes various kinds of modeling and analyses that have been done to aid strategic decision making. These range from various micro economic models, to analyses of structural forces within an organization and an industry, from strategic clustering and categorization to identification of rare and valuable resources and core competencies, from theories of organizational learning to principles for knowledge management. Each of these analyses has proven to be valuable in gaining some particular kind of insight in developing strategies. However, there is no integrating framework that facilitates an appreciation of how they complement or contrast with one another towards the common objective of aiding strategic decisions.

Research discussions on business strategy may be broadly classified into three categories. Those that model the firm as a "black box" operating in an environment of opportunities and threats, those that model the internal capabilities of the firm but ignore the details of the changing environment, and those that start from one of the first two categories and incorporate parts of the other.

The first category of strategy research is typified by Porter's [Michael Porter, *Competitive Strategy*, The Free Press, 1980] analysis of the external forces that affect the success of a firm. Strategy follows from this analysis by identifying actions that would alter the strengths of these forces in favor of the firm: firms should perform actions that reduce the bargaining power of buyers and suppliers and reduce the threat from new entrants and substitutes. This prescription does not go far enough to take into account the kinds of activities the firm is good or bad at doing. In other words, while the external threats and opportunities are considered in coming up with a strategy, the internal strengths and weaknesses of the firm are not. Porter's subsequent research on value chain analysis [Michael Porter, "What is Strategy?", *Harvard Business Review*, 32(1), 1996, pp. 10–20] addresses the importance of the primary and support activities performed by the firm. The differences in the strengths and weaknesses of these activities between competitors is used to explain the difference in performance of firms within an industry segment. These activities (and their relative strengths and weaknesses) are viewed solely as the target of strategy implementation and not as a source of strategy definition. The relationships between the activities along the value chain and the external opportunities and threats are not directly established.

The strategic alternatives offered by Porter's approach are cost leadership, product differentiation, or niche focus. The emphasis is not on the tailoring of an individual firm's strategy, but on being a member of one of these broad classifications and not being "stuck in the middle." Miles and Snow [Raymond E. Miles and Charles C. Snow, *Fit, Failure and the Hall of Fame*, The Free Press, 1994] also suggest that organizations fall into one of three general strategic types: They classify organizations as Defenders, Prospectors, or Analyzers. Each of these strategic categories are associated with the appropriate organizational structure, processes, and technology usage that have been observed to be consistent. This knowledge is used to suggest what a firm must do to be aligned with the strategic category it belongs in. In order to perform this analysis, the details of a firm and its environment are defocused and generalized to fit one of the broad strategic categories. It is in this abstract, general level that the firm is analyzed and the misalignment of its structure and processes is identified. These findings have to be made actionable by focusing them back to the detailed, firm-specific level. The difficulty of the last step lies in the fact that there can be no prescribed methodology by which it could be done. The detailed understanding of the firm, and especially those aspects that make it differ from the typical member of the strategic category are not utilized while performing the general analysis and become hard to fold back into the recommendation phase.

The second category of business research consists of the work done on the resource-based view of the firm [Jay Barney, "Firm Resources and Sustained Competitive Advantage", *Journal of Management*, 17(1), 1991, pp. 99–120; Ingemar Dierckx and Karel Cool, "Asset Stock Accumulation and Sustainability of Competitive Advantage", *Management Science*, 35(12), December 1989, pp. 1504–1514; Margaret A. Peteraf, "The Cornerstones of Competitive Advantage: A Resource-Based View", *Strategic Management Journal*, 14(3), 1993, pp.179–191] and core competencies [Prahalad and Hamel, 1990; Gary Hamel and C. K. Prahalad, *Competing for the Future*, Harvard Business School Press, 1994]. They differentiate themselves from the first category by postulating that the central source of competitive advantage is driven by the resources and capabilities within the firm. To be strategically significant and sustainable, these resources and capabilities must be valuable, scarce, and non-tradable (difficult to imitate or substitute). Strategy, in this view, is the identification of and investment in these resources or capabilities. This framework leaves two key concepts implicit: The relationships between resources and the environment and the interrelationships between the resources.

The first relationship is the reason behind the value of a resource. The resource-based view states that the resources should be valuable, but does not explicitly model the conditions under which this is the case. The rapid environmental changes that are being brought about by globalization, deregulation, and technology make it unreasonable to assume that any resource will continue to remain valuable, independent of the scenario in which a firm finds itself operating. This makes it important to condition the value of a resource on the scenario. If this is only implicitly done at the time of the initial assessment of its resources, a firm may find itself investing in the wrong resources as the environment inevitably shifts into a new scenario. The explicit association of resources to scenarios allows the formulation of a strategic plan that dynamically controls investment in resources as new scenarios are forecast and visited.

The second form of relationship acknowledges the fact that resources and capabilities in a firm do not operate in isolation. They enable and improve each other as well as disable or detract from each other. These relations are important to capture because they are, when positive or enabling, often the key toward making a capability rare and hard to imitate. Alternatively, when these relationships are negative or disabling, they explain why some firms cannot capture the full potential value of a resource. Finally, in the absence of these relationships, one runs the risk of looking at a resource in isolation and discounting its value (perhaps because it is tradable) by ignoring the fact that it enables other "valuable" resources. The key breakthrough in core competencies is in identifying these core resources on which the entire firm depends, but this too does not model the explicit relationships in its framework.

The deficiencies identified above are being addressed by research approaches that either start from the internal view of strategy and move to the external side or take the reverse path. As an example of the former, Black and Boal [Janice A. Black and Kimberly B. Boal, "Strategic resources: Traits, configurations and paths to sustainable competitive advantage", *Strategic Management Journal*, 15(x), 1994, pp. 131–148] describe a research approach that starts from the resource-based view of the firm and incorporates relationships between resources. Here, they do consider causality and the enhancing and suppressing nature of the relationships. This allows them to build decision trees to decide when even a tradable resource may lead to sustainable competitive advantage. However, they do not consider the relationships of resources to external opportunities and threats in determining strategic competitive advantage. The decision trees constructed to judge whether a resource will lead to sustainable competitive advantage are inward looking and do not seem to consider the relevance of the resource in the current external environment or the rents it can obtain. If so, there is nothing preventing someone from using these decision trees to conclude that the resource factors that have been proven to lead to sustainable competitive advantage in the past will continue to do so now or in the future. Finally, like activity webs, all the relationships are strictly Boolean and consequently, so are the decision trees. This prevents an accurate evaluation of a resource that has a strong enhancing relationship with another strategically important resource as well as a weak suppressing relationship with yet another resource, leading to the incorrect conclusion about whether the resource supports sustainability.

Porter [Michael Porter, "What is Strategy?", *Harvard Business Review*, 32(1), 1996, pp. 10–20] has proposed activity webs to capture at an abstract level, the activities that a firm performs and how they are linked to other activities and the strategic positions the firm wishes to achieve. The nodes of the web represent the strategic positions and the activities that enable them. The connections between the nodes represent the reinforcement between the activities and positions. Porter views strategy as this interconnected web of activities and credits sustainability to the composite of interconnections and activities instead of the individual activities. These webs allow the evaluation of a firm in terms of the consistency and reinforcing effects of its activities. This approach of explicating what is usually a tacit understanding of the relationships between a firm's activities and linking them to the firm's strategic positioning is a step in the right direction, but we feel does not go far enough. It does not distinguish between positions that provide value to the customer from positions that provide value to the firm. This could lead to the design of an activity web that provides consistency and reinforcements to positions that do not provide any value to the market, resulting in a poor strategy that may be hard to abandon for the very same reasons that make a good strategy hard to imitate. Consistency and reinforcements between these two classes of positions should be the object of design. Very often, activities designed to enable strategic positions that provide value to the customer hinder activities and positions that are of value to the firm. Activity webs do not represent these negative relationships, which should be as important as the positive ones. Porter describes firms, such as Southwest Airlines and IKEA, that have made strategic choices of excluding some positions that provide value to the customer. For example, Southwest does not provide pre-assigned seating or baggage transfers to other airlines, IKEA asks the customer to do the delivery and the assembly. These choices can be made only after observing the existence of the conflicting relationships and determining that the value lost from not providing a certain feature to the customer can be more than made up by the value gained from the resulting improvement in another strategic position. In order to fully capture these insights in the representation of a firm's strategy, the following clarifications should be made to the representation provided by Porter:

1. Who is the stakeholder that derives the direct value from a strategic position? Is it a customer, a supplier, or a shareholder?
2. What is the value of a strategic position? Is it due to revenue, marketshare, or mindshare?
3. What is the definition of an "activity"? How detailed should it be?
4. What is the nature of the relationship between two nodes? It may not be enough to say that a relationship exists. Which node is the cause and which is the effect?
5. What is the strength of a relationship? Is it positive (enabling) or negative (suppressing)? Is it possible to provide a quantitative value to represent the strength? Is it probabilistic?

The drawbacks of this framework are in the details. This prevents the use of automation through computational techniques in analyzing the network. As a result, while the activity web is beneficial in exposing the tacit relationships between a firm's various activities, the analysis that can be done once the web is modeled remains implicit. Nevertheless, activity webs represent the merger of the external and internal strategic analyses and therefore a novel and important step in business strategy research.

There have been recent efforts [*Strategic Management Journal*, Vol 18, Summer Special Issue, 1997] to focus attention away from the debate over whether firm capabilities or market competition have a bigger influence on the success of a firm. Instead, researchers are now trying to understand the way in which capabilities and competition mutually influence each other. However, the effort seems to be in the area of inferring the impact competition has on capabilities and the impact capabilities have on competition. McGahan and Porter [1997] builds upon the work of Rumelt [1991] and Schmalensee [1985] in attempting to explain the statistical variance in firm performance on variances in industry, corporation, and firm (therefore indirectly, on capabilities). Here, the debate is no longer on whether one factor is insignificant compared to the other, but only on the relative importance of the factors. Not surprisingly, the relative performance depends on the industrial sector. Manufacturing industries appear to derive more of their performance variance from variance in firm capabilities, while service industries are more dependent on industry variances. While the usefulness of these studies towards the advancement of strategy research is not in question, it remains unclear how a strategist is supposed to use these results. Should the strategist for a firm in the manufacturing sector start to place strategic emphasis on firm capabilities and not on the competition? Clearly, no one is suggesting such a bipolar view any longer. In that case, the debate over the degree of relative influence by the factors is largely academic, while practitioners continue to wrestle over how to best formulate strategy by placing equal emphasis and rigor on the internal dynamics of the firm and the external interactions with the market. Research on this issue remains lacking. The importance of this void becomes more so now, because the existing strategy formulation frameworks come from researchers that previously belonged to one of the two schools of thought, and therefore are weak in modeling either the market or the firm.

Current research emphasis is on explaining the reciprocity of competition and capability. Economists, ecologists, and many strategists have long established the impact of competition on shaping capabilities. Competition forces price down to the marginal cost, forcing firms to either adapt their capabilities or exit the market. Ecologists place a greater importance on the exit of firms that do not fit the environment as the cause for shaping capabilities, while strategists take the view of conscious organizational change as the cause. This debate and the underlying observation of competition shaping capabilities do not come directly to the aid of those trying to formulate strategy for a firm (except for the futility of their effort if the ecologists are right). The conclusions are too general to be of prescriptive use. Instead, research is required to convert the insight that competition shapes capabilities into a methodology that allows the practitioner to identify the environmental factors that affect the usefulness of a specific capability.

The other aspect of reciprocity is that firm capabilities affect the competition. Studies on this topic use large data samples to identify the internal factors that influence firm performance. These studies statistically confirm fairly intuitive relationships such as, new technological capabilities result in increased market share in the presence of specialized complementary assets, or, collaborative relationships between firms from different industries place more importance on skill sharing. These ideas are not new to strategy practitioners, and the studies confirming them have more academic value than practical and prescriptive significance. Research on the development of frameworks that allow practitioners to explicitly model how and to what extent, capabilities affect each other and external environment is needed to complement the statistical confirmation that such interactions do exist. The objective of such frameworks should be to move beyond generalizations of environments and firm capabilities and towards modeling the specific details of the particular environment and firm capabilities that practitioners find themselves in when they attempt to develop strategies.

A brief scan of the literature on thinking, learning, and decision processes shows that much of our current theory on how people think is based on our ability to form associations among concepts or objects in our environment based on categories. People are tremendously adept classifiers. We quite easily form groupings of the objects in our world according to our past experience. We can span a spectrum of abstract through specialized classes of objects and form these groupings based on associations of the attributes that appear in common among objects. Of all the associations that we might form, we seem to prefer those that aid in making deductive or inductive inferences about classes of objects. (For a very readable overview of this subject, see *Thinking: An Invitation to Cognitive Science* edited by Smith and Osherson, MIT Press, 1995, especially Chapter 1 "Concepts and Categorization.")

We build our work on the existing research in cognitive science, particularly cognitive mapping, the representation of an interrelated set of concepts in a graph. This basis allows us to develop the basic conceptual building blocks of strategy and to represent the interrelationships among them. In the activity webs described in Porter's most recent article, we see the rudiments of a specialized kind of cognitive map. Activity webs describe a related set of concepts about a particular business. The activities in Porter's webs are conceptually very similar to core capabilities [Gary Hamel and C. K. Prahalad, *Competingfor the Future*, Harvard Business School Press, 1994], the Resource Based View [Bergerfelt [1982], Miller and Shamsie [1995], Black and Boal [Janice A. Black and Kimberly B. Boal, "Strategic resources: Traits, configurations and paths to sustainable competitive advantage", *Strategic Management Journal*, 15(x), 1994, pp. 131–148], and many others]. His examples are Southwest Airlines, Ikea, etc. Arranging capabilities in a map showing their interrelationships as Porter has done we believe is novel in the management literature. However, his activity webs miss many features that commonly appear in more formal cognitive mapping. It is these features that give cognitive mapping more analytic power. In particular:

There is no definition of what should comprise a node.

There is no epistemology for different kinds of semantically distinct nodes.

There is no definition for the different kinds of relationships that the webs illustrate.

The lines showing relationships illustrate only that a relationship exists:

The relationship lines do not indicate causality.

Without more detail in the definitions of what concepts are illustrated by the nodes and connecting lines on activity webs, their potential communicative power is unrealized and their analytic potential is unfulfilled. Also, it is doubtful that the process of constructing an activity web can be made rigorous and repeatable.

SUMMARY OF THE INVENTION

It is therefore an object of the present invention to provide an integrating framework that facilitates an appreciation of how different analyses complement or contrast with one another towards the common objective of aiding strategic decisions through a network representation of a firm that depicts its resources, capabilities and value propositions, and their interrelationships.

A further object of the invention to take into account the kinds of activities that a firm is good or bad at doing.

It is also an object of the invention to provide a framework in which a detailed understanding of the firm is utilized at each stage in the process of arriving at strategic decisions.

Another object of the invention is to explicitly associate resources to scenarios, allowing formulation of a strategic plan that dynamically controls investment in resources as new scenarios are forecast and visited.

A further object of the invention is to distinguish between positions that provide value to the customer from positions that provide value to the firm.

It is another object of the invention to provide a framework that allows the use of automation through computational techniques in analyzing the network.

It is also an object of the invention to allow explicit analysis, rather than relying upon implicit analysis.

A further object of the invention is to allow the practitioner to identify the environmental facts that affect the usefulness of a specific capability of the firm.

Another object of the invention is to provide a framework that moves beyond generalizations of environments and firm capabilities and toward modeling the specific details of the particular environment and firm capabilities.

It is still another object of the invention to develop a strategic modeling framework that allows the capture of management's tacit understanding of their firm's capabilities, their interrelationships, and their linkage to strategic positions of today and future scenarios.

A further object of the invention is to provide a framework that explicitly and equally captures the internal (capabilities and resources) and external (markets and positions) aspects of business strategy.

It is also an object of the invention to provide a framework that operates at the level of the firm and not at a generic strategic category level.

Yet another object of the invention is to have a framework that allows for fuzzy, probabilistic, and other qualitative and quantitative characterizations of the relationships between the various strategic entities.

A further object of the invention is to enable the formulation of computational algorithms to perform analyses such as:

a. evaluation of the degree of alignment of capabilities and strategic positions,
b. identification of core capabilities, and the degree of dependence of a capability on the capabilities of suppliers and partners.
c. identification of opportunities for new resources and capabilities to reinforce existing ones,
d. estimation of the strategic value of capabilities and resources, and
e. estimation of the implementation and maintenance costs of desired strategic positions.

Still another object of the invention is to provide a framework which provides new insight into the formulation of a strategic plan, and in particular helps analyze when and which capabilities should be developed, maintained, and divested in the context of identified future scenarios.

It is another object of the invention to move toward a computational and algorithmic approach in order to develop frameworks that give useful, rigorous, and repeatable results, so that the framework that can be used by a trained consultant with a client to develop new strategic insights.

A further object of the invention is to have a framework in which the results achieved are grounded in a provable logic and do not rely solely on the art of an individual practitioner.

In the prior art, no integrating framework disclosed because practitioners approach the task of modeling with an analytical method already in mind and, therefore, concentrate only on those aspects that are relevant to the analytical method chosen. The present invention approaches the investigation from the reverse direction. Starting with the firm in question and modeling the relevant strategic components in a general framework, we then apply one or more of the analytical methods found in the literature. This is only possible if it is clear what the "relevant strategic components" should be. Given the breadth of strategy literature, it is clearly impossible for a universal framework to accommodate all analyses. However, if the focus is on a subset of popular, well established analyses, we believe a modeling framework of the relevant strategic components is possible. The challenge here is to be able to relate the concepts and components imported from the different analytical models into a consistent epistemology.

Our framework operates at the level of the firm and attempts to incorporate the strategic components relevant to both the external opportunities and threats from the market as well as the internal strengths and weaknesses of the firm. Michael Porter's analysis of industry structure from the perspective of the five forces that act on it is a well established approach to addressing the strategic issues surrounding the external opportunities and threats coming from the marketplace. We adapt this methodology to identify the various external constituencies with which a firm interacts. These include customers, suppliers, complementors, and stockholders. In order to estimate the strength of the forces, we identify the value propositions made to each of these constituencies (the value propositions to the stockholders are associated with the forces due to competition and new entrants).

For example, the online bookstore, Amazon.com makes value propositions such as, large selection, low price, efficient search, book recommendation service to its customers. It provides e-commerce capability and sales commissions to its complementor web sites that refer buyers via recommended book links. To its suppliers, the book wholesalers, it provides increased volume from a rapidly growing market segment. To its stockholders, it is attempting to provide a sustained and growing business by developing name recognition, largest reach into the market segment, and repeat customers. The identification of the external constituencies and the value propositions offered to them allow the analysis of the firm with respect to the external opportunities and threats. For example, strategic positioning requires the estimation of the strengths of these value propositions and how they may change in future scenarios. However, there is the potential for additional analyses when the value propositions are linked to those internal capabilities of the firm that are responsible for creating them. This forms the second layer of our framework.

Studies on core competencies and resource based views of the firm have identified the strategic importance of the bundles of assets and activities within the firm. These capabilities determine the firm's proficiency in delivering one or more value propositions. The proficiency of a capability itself may depend on, or be enabled by, other capabilities. Amazon.com's capabilities to attract customers to their web site and offer price discounts support market reach, which is a value proposition to its suppliers and stockholders. The capability to attract customers is enabled by the capability to design friendly web interfaces, the capability to provide personalized book recommendations, and the capability to efficiently provide information about a large selection of books. Capabilities may also depend on more tangible assets called resources in our framework. Amazon.com's exclusive agreements with popular Internet search sites is an example of a resource that enhances their capability to attract customers to their web site. Unlike the resource based view, our intention at this level of the framework is not just in identifying the unique, rare, or inimitable capabilities of value to the firm, but also to causally link them to the supporting capabilities and resources that may be easier to obtain and trade. A linkage need not necessarily be of an enabling or enhancing nature, it could also be disabling or suppressing. For example, Amazon.com's capability to fulfill orders by mail suppresses its capability to offer low prices because shipping charges are often a significant fraction of a book's price. Links therefore, have the attributes of direction and weight. Direction indicates causality and the weight indicates the enabling or disabling nature of the link as well as its strength. This process of identifying capabilities, resources and the causal linkage between them results in the creation of a directed network or influence diagram of interrelated business capabilities that support the firm's value propositions and are themselves supported by the firm's resources. The network allows the coexistence of quantitative and qualitative attributes about the nodes and links, supporting computational analyses as well as aiding human reasoning and understanding.

This network depicts an explicit representation of the knowledge that might otherwise remain tacit within the firm's management. This knowledge includes: the internal capabilities and resources, the value propositions being made to the external environment, the interrelationships among them and the facts or attributes that describe these network elements in detail. In some areas, these attributes are objectively observable or measurable. In other cases, we must rely on more subjective individual or collective experience. A comprehensive view of this knowledge requires of the elicitation of the partial knowledge held by individual members of the firm management in a semantically consistent way to produce the composite picture. A formal framework for organizing the knowledge facilitates this elicitation and combination process. This process also exposes areas of conflict and consensus that allow the capture of the degree of uncertainty in the knowledge. It shows where a given decision might be based on uncertain, conflicting knowledge and is therefore, itself uncertain.

We next summarize some of the analyses enabled by the construction of a strategic capability network. The structure of the network can be analyzed to identify distinctive patterns that are noteworthy. These include: alignment—a set of capabilities that all reinforce the same set of value propositions; circular reinforcement—a set of capabilities that reinforce each other; segregation—isolated portions of the overall capability network with little relationship to each other; and conflict—a set of capabilities that actually diminish the effect or the value derived from some other capabilities. Southwest Airlines is a good example of the alignment that occurs when a company focuses on a specific cost position and value proposition to a well defined market. The Amazon.com example cited earlier where the physical distribution of goods is accomplished by the mail rather than through some lower cost means appears as a conflict on a capability network. Constructing a Web based extension of a traditional retail business where the business model focuses on attracting customers to the store from the Web site and to the Web site from the store would be a circularly reinforcing business design. Segregation occurs where some or all of an underlying capability set such as research, development and manufacturing is used to support two distinct brands, such as Toyota and Lexus or the separation of Saturn's manufacturing, development and marketing from the other GM divisions.

The presence of undesirable patterns and the absence of desirable ones identifies opportunities for improvement. This isolates the capabilities that need to be strengthened and others that are under exploited. The addition of new alignments to important value propositions and the creation of new circular reinforcements among capabilities can be investigated by looking for partnerships or the purchase of tradable capabilities such as those enabled by technology resources. The presence of the causal relationships allow the identification of capabilities and resources that must be strengthened to improve the effectiveness of the enabled capability or value proposition.

The network also helps in predicting which competitive advantages are sustainable. Sustainable competitive advantage stems from the presence of unique resources and capabilities in the firm that are difficult to trade and hard to imitate. Often, sustainability arises not from a single capability, but from a bundle of capabilities that provides a unique form of synergy to the firm. The depiction of these sources of sustainability in the network helps identify opportunities to leverage them further. The capabilities and resources that support these unique capabilities can also be identified in order to appropriately value their contributions.

The framework of the invention may be used to develop schemes for valuation of the firm's capabilities and resources. The firm bears costs in the acquisition and maintenance of resources. Likewise, the firm derives value from the acceptance of the value propositions that it offers. The network of capabilities as described comprises the linkage between resources and value propositions internal to the firm. The relationships that comprise the network provide the basis for distributing costs from resources to value propositions and conversely for distributing value from value propositions to resources. As a result of the cost and value distribution, we compute both cost and value of the firm's capabilities for relative comparisons of their contributions within our framework. We suggest the use of this valuation process as helpful in clarifying the best set of investments in the continued development of the firm. Indeed, it may even be possible to develop an optimization model. When considering the firm's strategic investments in light of a set of alternative future scenarios, it is important to identify those capabilities and resources that will be expected to provide a business return across many scenarios. We call these capabilities robust and note that they are distinct from those more specialized capabilities and resources that provide a business return in only one future scenario or another. Our framework will help to quantify the business value of capabilities and resources considering that distinction. Moreover, the analytical schemes that we have developed allow for the attribution of costs of the various value propositions that the firm supports. As market segment sizes change, buyer preferences and needs vary, and competitors' offerings and pricing converges, the revenue that a firm can derive from a given offering to the market can change dramatically. In our work, we focus on the relative costs and expected revenues of value propositions to help distinguish the profitable, sustainable, and therefore, desirable strategic investments.

In summary, our invention focuses on a view of an individual firm that captures the essential strategic components and the interrelationships between them. In our approach to the problem, we note that a particular technology and the management of it represents a business capability. Amazon.com's scaleable servers supporting their Web-based catalog and representing their on-line virtual inventory is an example. IT capabilities are in many ways just like any other (non-IT) business capability: they comprise a set of skills, knowledge, and physical assets engaged in a set of activities that helps the client firm ultimately to serve a market need. To analyze IT capabilities, the real unit of analysis that is of interest to the client, we need a robust and complete description of what IT capabilities are and we need to be able to place IT capabilities in the context of all else that businesses do.

From the broader perspective of general business capabilities, we can reformulate IT valuation questions in terms of the larger business problem of studying business capabilities in general:

What capabilities are needed to support my current/desired strategic position?

What resources support/enable these capabilities?

What are the business returns from investments in these resources?

What can be done to increase the returns from investments in these resources?

In these questions, we are focusing on analyzing the firm as a collection of capabilities and resources deployed to support the strategy of the firm for serving a market.

BRIEF DESCRIPTION OF THE DRAWINGS

The foregoing and other objects, aspects and advantages will be better understood from the following detailed description of a preferred embodiment of the invention with reference to the drawings, in which:

FIGS. 7a–c is a series of capability networks showing the benefit of a detailed representation of capabilities in determining means for improvement.

DETAILED DESCRIPTION OF A PREFERRED EMBODIMENT OF THE INVENTION

Strategy formulation for the producers of goods and services should begin by considering the value delivered to the buyer and recognize the decision process and evaluation of that value from the buyer's point of view. In some cases strategy formulation might be influenced by the internal resources and capabilities of the firm, but even in these cases, the nature of the influence only becomes clear in the context of the value being delivered externally.

When buyers (end consumers, retail, corporate purchasing, etc.) consider a purchase of goods, services, or bundles of both, they ultimately evaluate a set of attributes including price and other features to make the binary decision: to buy or not. A model of the buyer's view of the offerings of a firm is a useful starting point to focus the discussion of strategy. Such a model should help in the understanding of the buyer's decision process by identifying the relevant attributes of the product and the value placed on these attributes by the buyer. This model should aid in the identification of class of buyer that the firm is targeting and reflect the specific tradeoffs and choices that the firm has made in making an offering to a target class of buyers.

Figure 1:
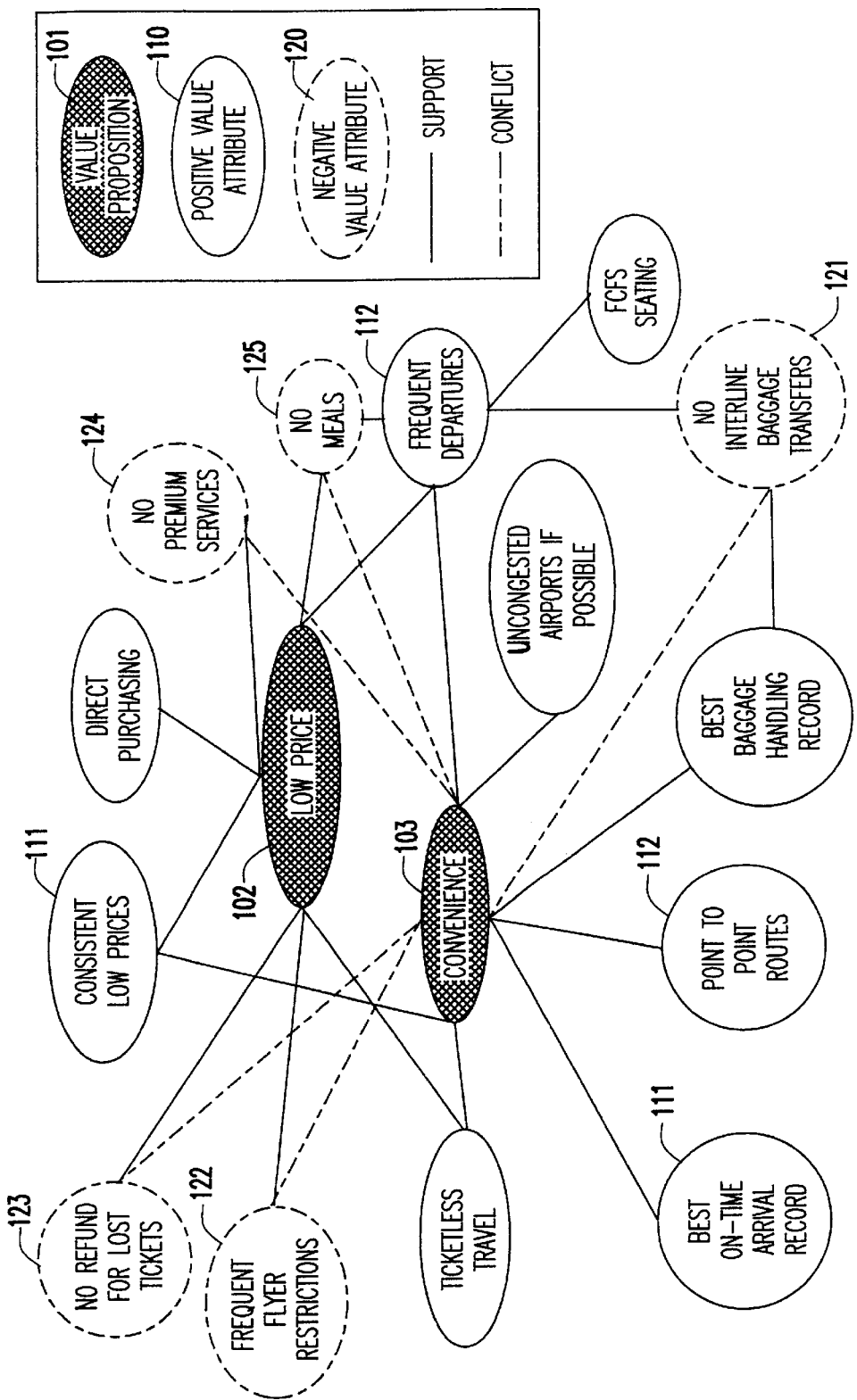
FIG. 1 is a schematic showing decomposition of value propositions in a particular business context.

Turning now to FIG. 1, we will describe our model of the offerings of a firm. It incorporates a two-level decomposition of the value that a firm offers to the market. Value propositions 101 appear at the top level. These are the major groupings of value that the firm offers. As a group, they may represent a unique offering to the market. General examples are: low cost, high quality, and customer convenience. The specific value propositions shown are low price 102 and convenience 103. The second level of the hierarchy describes how each value proposition is delivered in terms of the value attributes of the offering. These are the specific characteristics of the value propositions that the firm has chosen to provide.

A firm's ability to deliver a value attribute relies on a set of activities it performs. This set may be collectively thought of as a capability. The quality of the value attribute delivered is directly related to the effectiveness of the supporting capabilities. Examples of capabilities include: innovative design of products or in-store merchandising. Capabilities themselves may be supported by other capabilities. The resulting network of interrelated capabilities forms the second layer of our framework.

The bottom layer of our framework is composed of resources, These are the physical assets that a company deploys to perform the activities represented by its capabilities. Examples may include: in-house engineers and designers, store locations, store layout design staff. Our definition of resources is distinct from that given in the Resource Based View of the firm. Resources represent the tangible (people, policies, capital, technology, etc.) and intangible (brands, etc.) assets of the firm. Usually, resources have a finite capacity to support a firm's activities. They are the points at which a firm directs its investments. Acquiring more capacity usually involves additional costs to the firm.

These concepts and the linkages between them form the strategic capability network. This framework focuses on the capabilities of the firm and places strategic value on them based on the degree of their support to the external value propositions made by the firm. By linking capabilities to the enabling resources of the firm, the framework assists in guiding strategy formulation to the investment or disinvestment decisions that must ultimately be made by the strategists. We now describe these concepts in depth and fit them into the SCN framework.

Value Propositions

At the top of our framework appear value propositions. These form some general statement of the customer benefits that the business delivers. In general, marketing or advertising oriented messages such as "every day low price" or "large selection" are good starting points for defining value propositions. For the buyer, these will help form the general categorization of the supplier's offerings. Southwest Airlines' 1985 ad entitled "The Company Plane" helps make the point. It reads as follows:

" . . . With a schedule that dovetails beautifully with your own. With first rate service that includes complimentary beverages. And everyday fares that are so low it's almost like flying for free. Because our flights are so convenient, our service so attentive, and our fares so low, business people actually think of us as the company plane. . . . "

Southwest is describing themselves in general terms and is not focusing on the detailed specialization of its offerings. All airlines claim to offer convenience, service, and low prices. Southwest actually has very precise definitions of these general statements of value. Their definitions are not entirely the same as the normative definitions in the airline industry. They hint at the difference in claiming to provide first-rate service. They do not describe all of what that includes, but apparently, for Southwest, first-rate service includes attention and beverages. Anyone who has flown even once on a commercial flight will have at least gotten a beverage, if not a meal. Southwest is implying that they do not offer meals (which are held in contempt by many seasoned travelers) and they do not charge for them. Through this ad, they are telling prospective customers that they are generally the same as the larger and more familiar carriers and hint that they cater to business travelers. They have communicated enough information in this ad to induce someone to give them a try. What kind of someone? A traveler who has experienced one too many airplane meals, might like a cup of coffee on the flight, likes the flexibility that frequent flights provides, and wants a cheap fare.

In flying Southwest, that someone will notice a whole set of differences in the experience. These detailed differences make Southwest's offering specific. Travelers that value Southwest's specific offerings will become loyal repeat customers. The detailed specifications of the general value propositions are what we call value attributes within our framework and we describe these next.

Value Attributes

Value attributes represent the specific attributes of the offering which a buyer must evaluate in order to assign a value to a general value proposition. This evaluation is done on the basis of what the buyer has to do in order to evaluate, acquire, and use the offering. We normally think of value attributes as a substitute for a buyer capability and for this reason, the buyer places a positive value on this attribute 110. However in some cases a supplier may choose not to provide certain attributes, normally provided by competition, imposing the need for a capability on the buyer. We represent these choices as negatively valued attributes 120. For example, Southwest's choice not to provide interline baggage transfer requires passengers to perform that activity themselves. This will have a negative value for those passengers who will transfer to a different airline.

A value attribute may support multiple value propositions and may even oppose other value propositions. These relationships among value propositions and value attributes form a network of dependencies as shown in FIG. 1. This figure shows how one might decompose the general propositions of value that Southwest Airlines offers into specific positively and negatively valued attributes. One can see in the detailed attributes, the result of the choices that Southwest Airlines has made in composing its business. One can also get an indication of the kind of customer to whom Southwest appeals.

Due to the presence of negatively valued attributes, not all of Southwest's choices have resulted in additional convenience for their fliers. The figure shows value attributes (no interline baggage transfers 121, frequest flier restrictions 122, no refund for lost tickets 123, no premium services 124 and no meals 125) that reduce the convenience 103 to their passengers, as shown by the dashed line between these attributes and the convenience value proposition 103. These tradeoffs are necessary to accommodate value propositions that oppose each other. In Southwest's case this means offering convenience within the constraints imposed by low pricing such as no lost ticket refunds 123 and restricted frequent flier advantages 122. For the market targeted by Southwest, these negatively valued attributes 120 are outweighed by the positively valued attributes (such as low price 111 and frequent departures 112) that they enable. The buyer decision process will make a tradeoff between all of the attributes supporting the value propositions in order to make a choice.

Relationships between Value Attributes

In addition to the relationships between value propositions 101 and value attributes (both positive 110 and negative 120), FIG. 1 also shows relationships among value attributes. The strategic significance of these inter-attribute relationships depends on their nature. In this section, we describe the types of relationships we consider relevant to the framework.

The first kind of relationship is that of correlation. Correlation may be observed by deductive or inductive means. When it is possible to model how a buyer makes use of the attributes of the product or service, one may observe the requirement of two or more attributes for a certain buyer activity. For example, a business traveler may require both frequent departures 112 and consistent low prices 111 for his business travel. These correlations are deductive but need to be validated through market surveys. Sometimes, correlations arise due to the nature of the market segment being served. In Southwest's case, one may observe a correlation between the preference for no meals 125 and no premium services 124. This can only be observed by surveying the marketplace and is therefore inductive.

Figure 2:
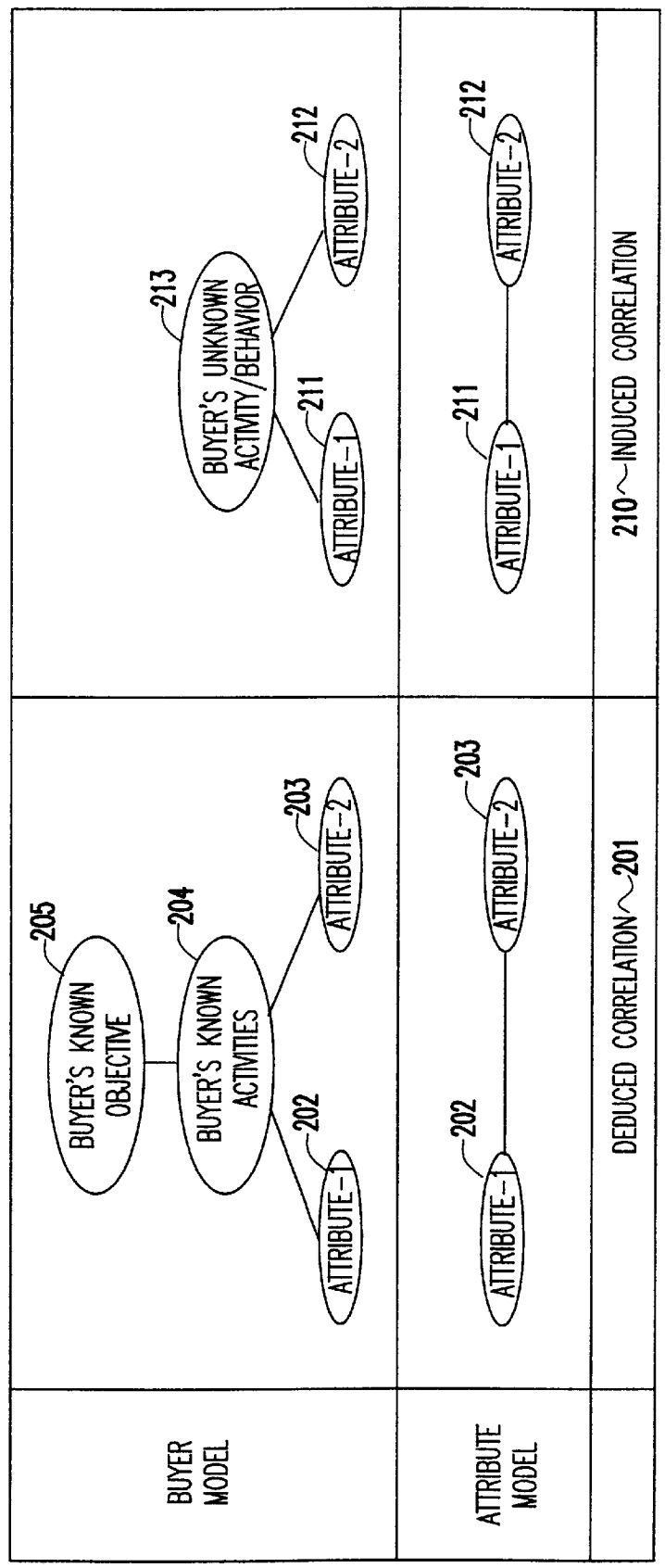
FIG. 2 is a chart depicting the graphical representation of correlation between two attributes, comparing deduced and induced correlations for buyer and attribute models.

These correlation relationships are shown in FIG. 2. Deduced correlations 201 between one attribute 202 and another 203 reflect a buyer's known activities 204 in pursuit of a known objective 205. Induced correlations 210 between one attribute 211 and another 212 depend upon inferential means to determine buyer's activities 213 which are not otherwise known. Correlations, whether deductively or inductively observed, influence the supplier's design of the product or service. The strategic decision here is whether to provide the correlated attributes based on the strength of the correlation. The supplier may also decide to rely on complementors (i.e. other firms whose products increase the market value of the first firm's product.) to provide some of the correlated attributes. In FIG. 2, which depicts the graphical representation of correlation between two attributes, the "Attribute Model" depicts the correlation between two attributes (202, 203; 211, 212) as explained by the "Buyer Model", whose explicit representation remains outside the scope of our framework.

Figure 3:
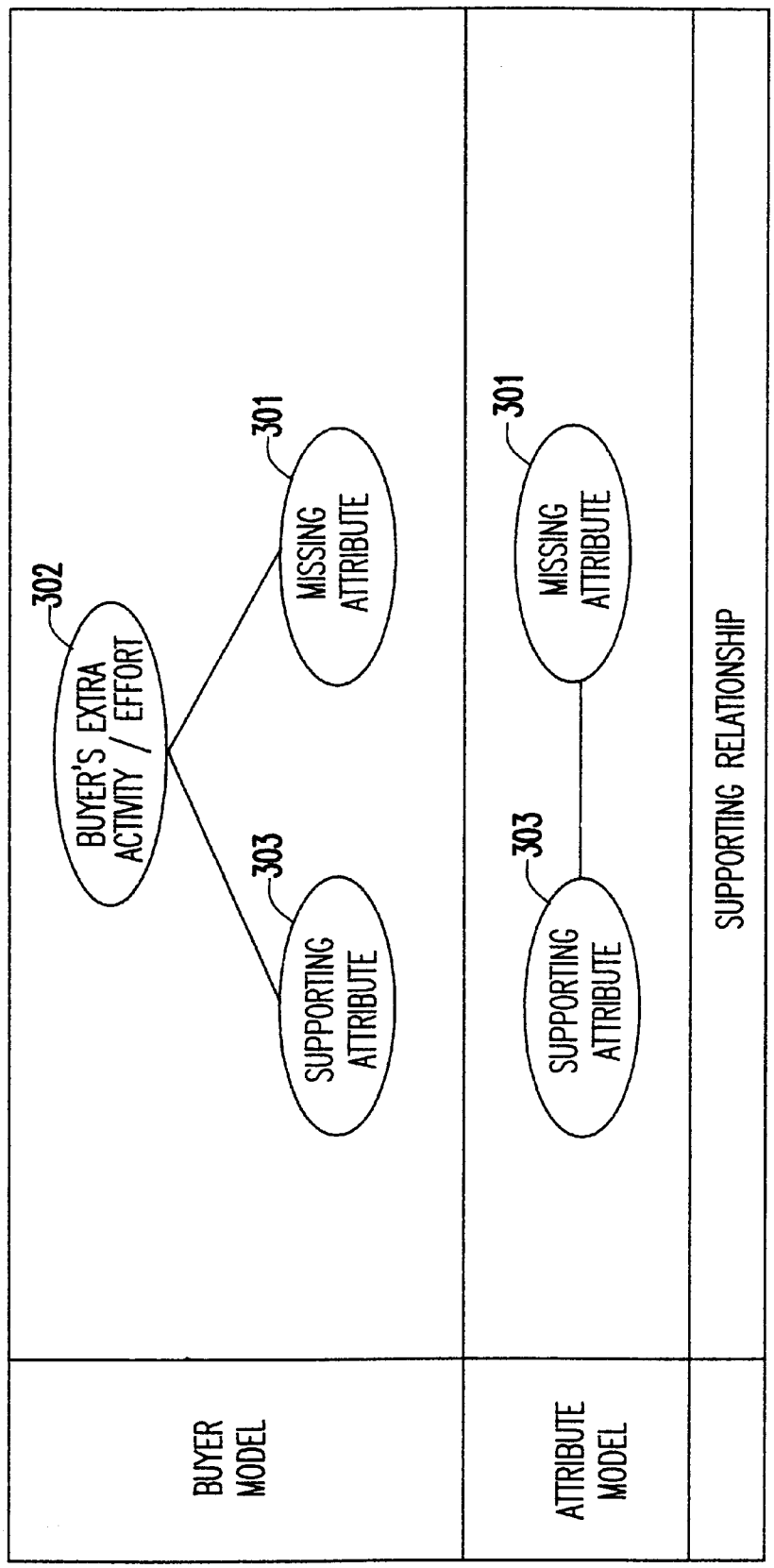
FIG. 3 is a chart depicting a supporting relationship between positively and negatively valued attributes, for buyer and attribute models.

The presence of negatively valued attributes 120 may add another type of relationship, as shown in FIG. 3. As described above, these are the attributes 301 that represent the absence of an attribute normally provided by competition and therefore require an additional capability and effort 302 on part of the buyer in order to use the product. A well designed product containing such negatively valued attributes 301 also includes positively valued attributes 303 that reduce the effort and simplifies the capability and efforts 302 required of the buyer. For example, the negative value of Southwest's policy not to serve meals 125 may be ameliorated by attributes such as good on-time arrival record 111 and short distance routes 112. FIG. 3 shows this form of a supporting relationship as depicted in the attribute model and the corresponding buyer model.

Figure 4:
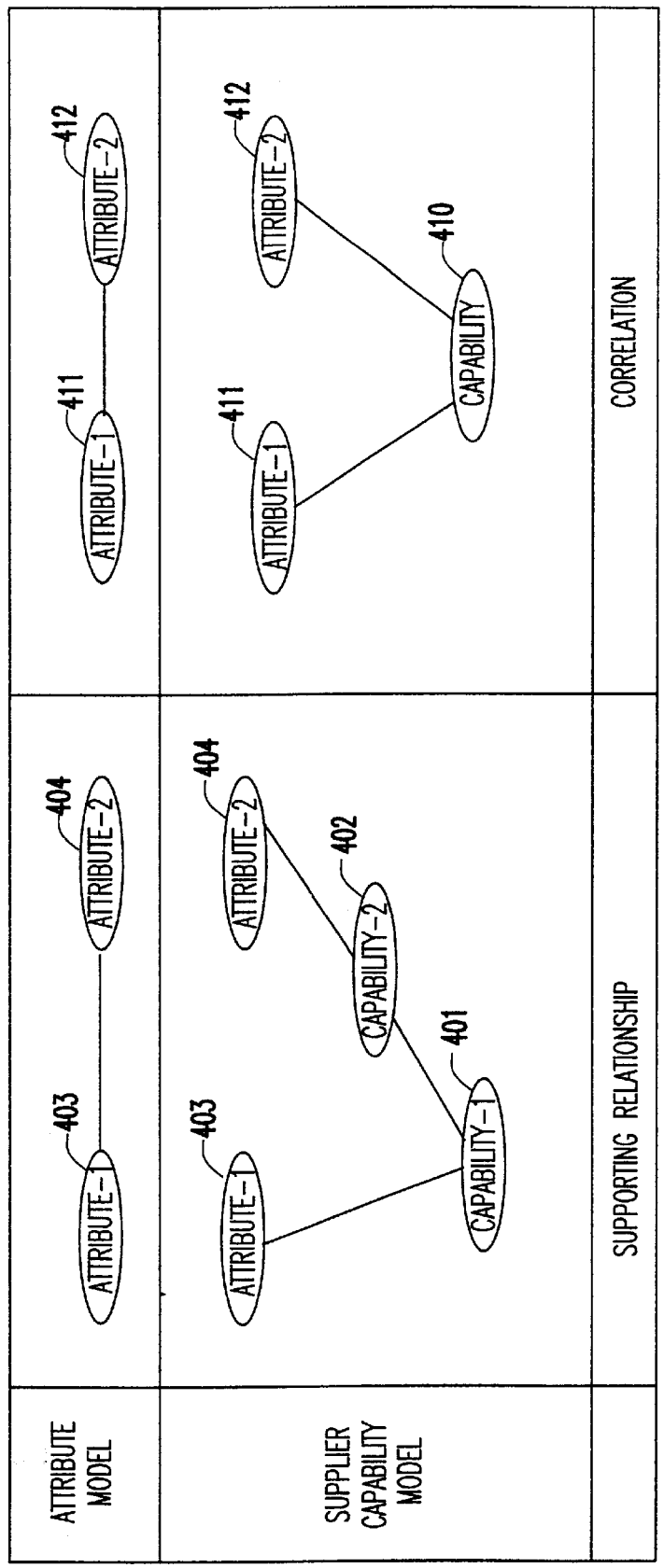
FIG. 4 is a chart depicting supporting and correlation relationships based on modeling the internal capabilities of a supplier.

So far, we have considered inter-attribute relationships that arise from modeling the buyer's activities. Turning now to FIG. 4, relationships may also arise from the knowledge of the supplier's internal capabilities (e.g. 401, 402) that deliver these attributes (e.g. 403, 404). For example, the Southwest's "no meals" attribute 125 supports the "frequent departures" attribute 112. This happens because the capability of fast aircraft turnaround is aided by the elimination of the activities to load meals on board.

FIG. 4 also shows another form of inter-attribute relationship arising due to the internal capabilities of the supplier. Here, a single capability 410 results in two product attributes (411, 412), which results in a correlation between them. The inter-attribute relationships due to the internal capabilities of the supplier are important from a strategic perspective if they are coincident with the relationships due to buyer preferences. Examples of well designed products and services show the presence of such coincidences. This is especially powerful if some of the internal capabilities that produce inter-attribute relationships are in some way rare or unique to the supplier firm. The section on modeling capabilities discusses this in more detail.

Identification of Value Attributes

The identification of the detailed set of attributes and their relationships describing value propositions is generally straightforward for an existing business. The difficulty arises when a supplier seeks new value propositions or ways to increase the value of an existing set of value propositions by considering new value attributes. In this section, we discuss a methodology for identifying value attributes that are relevant and valuable to the buyer.

Figure 5:
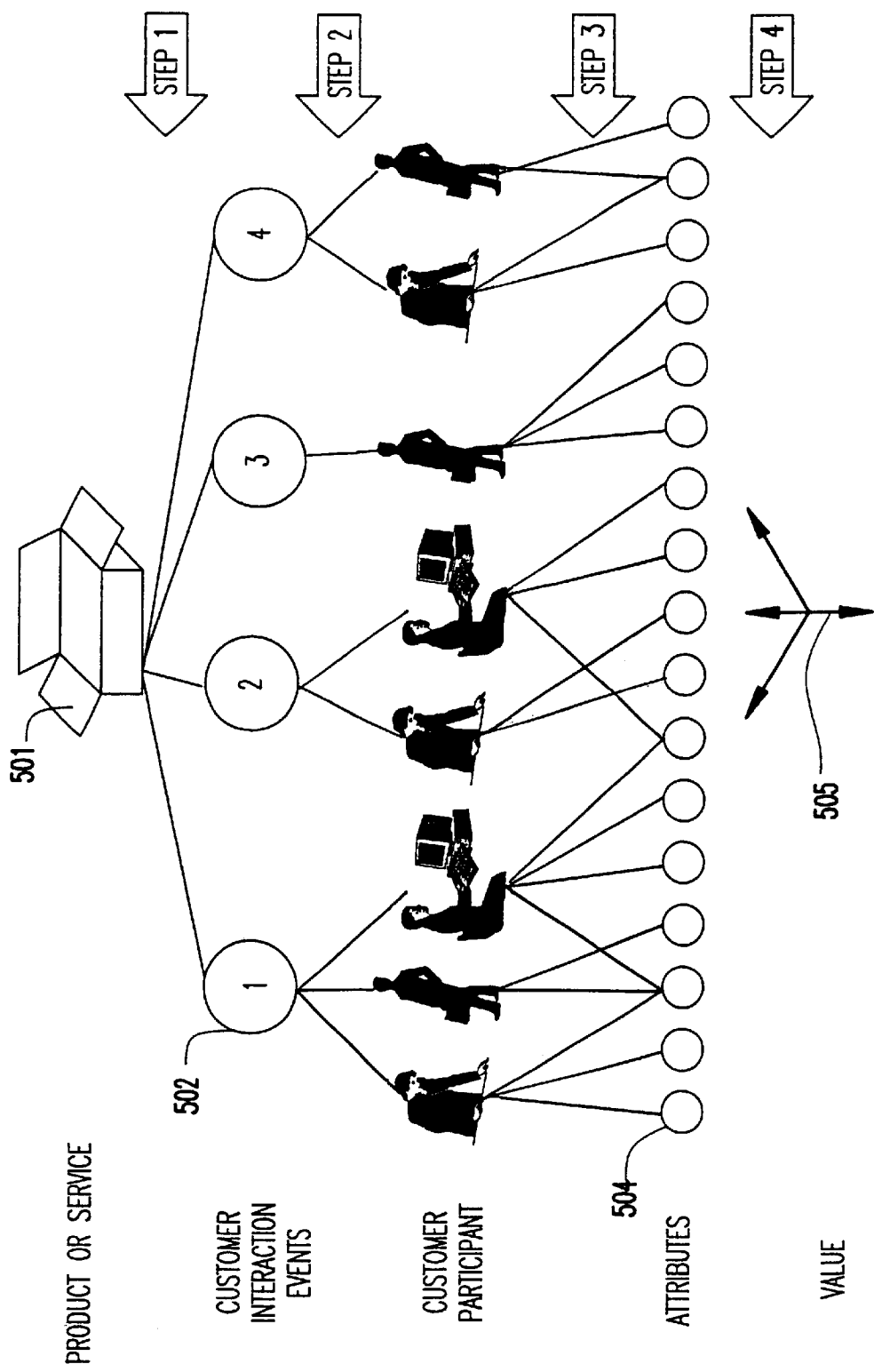
FIG. 5 is a diagram showing the relationship between value propositions, value attributes and customer decision processes.

One might view the whole subject of value propositions, value attributes and customer decision processes according to FIG. 5. At the top of the picture, we show some product or service 501 that is offered to the market. Moving down, in the next gray band, the picture illustrates that the customer's experience 502 of the product occurs through a process of evaluating, acquiring, and consuming a product or service. That is, we can decompose the overall value propositions of the firm into a number of events 502 that engage the buyer with the seller. We call these customer interaction events 502. Customer interaction events 502 are those points in time when the provider gets the opportunity to deliver something of value to the customer, who gets an opportunity to evaluate the experience. Examples are:

Product search and evaluation

Product purchase

Product usage

After sales service

Product upgrade

In general, these events help define the phases of the purchase transaction: information gathering, evaluation, payment, receipt, after sales service, etc. We want to encapsulate the experiences in this way to help identify the buyer's goals, interests, intentions, and needs which may differ in each event.

The next step in the process is to identify the participants 503 involved in each customer interaction event. These are shown in the middle gray band in FIG. 5. In inter-firm purchases these people might be the many specialists within the buyer firm. Here, the interaction events help in the identification of the participants from the customer firm that experience the event. These participants may have different perspectives on the same interaction event. For instance, during the product evaluation event, the ultimate user of the product will determine how the product fulfills his need, while the corporate buyer may look at the reliability of the supplier and its terms and conditions. Another participant such as the end user, who is actually paying for the product, may be looking at the product price. In a purchase by an individual, there is only a single person interacting with the supplier but acting in different modes and with different intent in each event.

Given these perspectives of the buyer, we can now consider what the seller brings to each event in detail. We can determine the attributes 504 of the seller's services, products, information, etc. that appeal to the participants 503 from the customer's organization. This determination is aided by answering the following question from the perspective of each customer participant in a customer interaction event:

How does the participant benefit from this interaction?

How does the interaction affect the participant's subsequent activities?

What are the dissatisfactions with the product?

Can these be observed or are they latent?

Customer may exhibit compensatory behaviors to overcome these deficiencies: do they use the product or service as intended?

Can the intended, industry-normative usage of the product be significantly revised?

What are the trade-offs and compromises made by the customer?

The answers to these questions begin to identify the attributes 504 of the customer interaction event that are relevant to the customer. As described before, these attributes often form supporting or opposing relationships with one another. These relationships help determine the attributes that should be included in each interaction event including those that form the product or service being offered. This task can be performed by market surveys where members from the target buyer classes rate and assign a value to the attributes being considered. These ratings, along with the identified relationships between the attributes enable the selection of the optimal set of attributes that support the value propositions of the offerings of the company.

Capabilities

When business strategists attempt to inform their decisions on the basis of the internal characteristics of a firm, they focus on a concept that is variously described as capability, competence, and resource. While the distinctions between these terms are often distracting, they have much more in common than in difference. These terms attempt to describe the ability to perform an indicated function. In the context of a firm's strategy, the relevant functions are those that directly or indirectly influence the desired purpose or objective of the firm. When describing this concept, which we will consistently call capability, it is the outcome of the function that is of more importance than the means of achieving the function. In other words, a capability does not define the activities and processes being performed but only the intended outcome of its execution.

The difficulty, and hence an area of debate and research in business strategy, has been in identifying the strategically relevant functions and the capabilities that achieve them. Proponents of "core competencies" suggest considering those functions that are at the root of the firm's competitive advantage and provide potential access to a wide variety of markets. The "resource-based view of the firm" focuses on those functions that are valuable and hard to substitute and those capabilities that are rare and difficult to imitate. These ideas are supported by the observation that a firm's sustainable competitive advantage within an industry must stem from those core capabilities that cannot be traded among or imitated by the competitors in that industry.

While the identification of these core capabilities is necessary, it is not sufficient when the objective is to formulate a strategy based on the internal characteristics of a firm. A core capability is of value to the firm only if its outcome can be converted to deliver a product or service to the market. This requires the presence of other capabilities which may be easily tradable and quite common across the industry. For example, if cross-docking is a core capability of a retailer, other tradable and imitable capabilities such as store management and product selection are also needed before the company can realize rents for its cross-docking capability. Conversely, a core capability may itself make use of tradable and imitable capabilities for it to be successful. Cross-docking requires a communications system between the distribution centers, suppliers, and store point-of-sale.

The effectiveness of the supporting capabilities are essential if a firm wishes to derive competitive advantage on the basis of its untradable capabilities. Strategists must therefore model these tradable capabilities that influence the value derived from a core capability as well as the capabilities that influence its effectiveness. The increasing prominence of tradable capabilities derived from advances in computing and communications technology, and their purported strategic significance makes it even more important for a strategist to relate them to the untradable capabilities of the firm. This allows a true evaluation of the strategic significance of the technology in the particular context of the firm.

Capability Networks

A model of firm capabilities will be incomplete if the relationships among capabilities are not represented. After all, it is the presence of these relationships that imparts strategic significance to the tradable capabilities owned by the firm. A relationship exists between two capabilities when the execution of one capability aids or hinders the execution of the other. For example, the capability to gather market data helps the capability to design new products. These relationships form when the outcome of one capability enables or influences the performance of another capability.

There can be various degrees of this influencing relationship. It may be impossible to perform a capability without the outcome from another. Alternatively, it may be possible to perform the capability, but at a different level of effectiveness. Relationships do not necessarily have to be of an enhancing or positive nature. An outcome of a capability may reduce the effectiveness of another. For example, the capability to find low prices by switching suppliers will diminish the capability to build close relationships with suppliers.

Figure 6A:
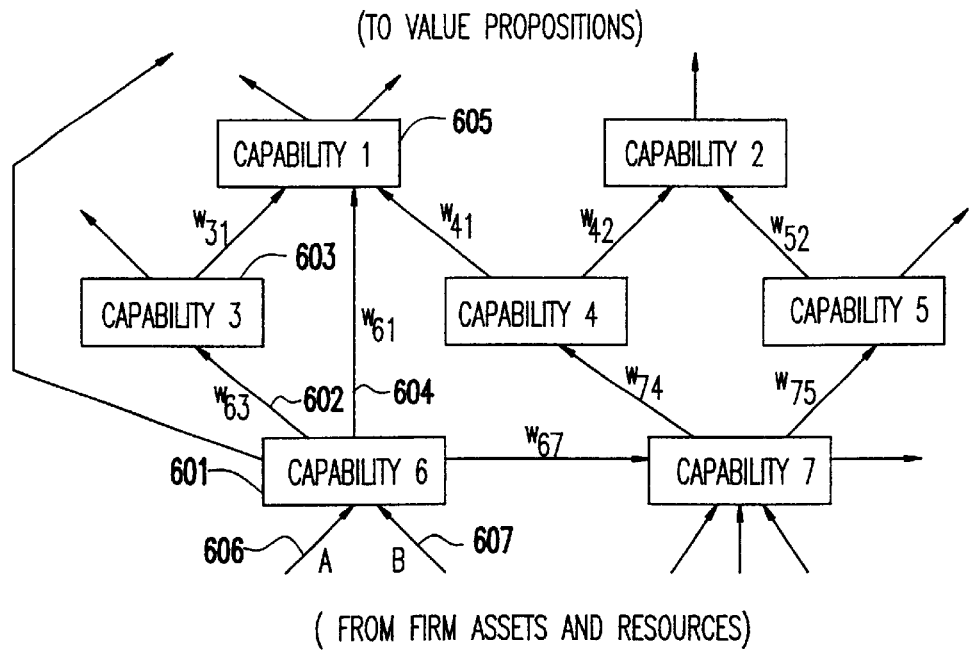
FIG. 6 is a schematic showing a capability network with a metric for the degree of support from one capability to another.

Capabilities and their relationships to other capabilities may be drawn in the form of a network where the nodes represent capabilities and the links represent the relationship. These links must have the attributes of direction and strength, to represent the directionality of the relationship and the degree of support (or conflict). FIG. 6A shows an abstract capability network where the degree of support from capability x to capability y is represented by $w_{xy}$.

The relationships that are enabled or supported by a capability depend on the various types of outcomes resulting from it. For example, one outcome from the capability to gather market data (e.g. capability 6 shown as 601 in FIG. 6A) is the knowledge of product features requested by the consumers. This is the outcome (e.g. the directional arrow 602) that affects the capability to design new products (e.g. capability 3 shown as 603). Another outcome may be the predicted market demand (e.g. the directional arrow 604), which affects the production planning capability (e.g. capability 1 shown as 605). This qualitative difference in outcomes point to the existence of at least two sub-capabilities within the original capability. It is often important to represent this detail by splitting the original capability into as many capabilities as needed to capture the different outcomes, as shown in FIG. 6B where capability 6 of FIG. 6A has been split into capabilities 6A (shown as 608) and 6B (shown as 609).

Figure 6B:
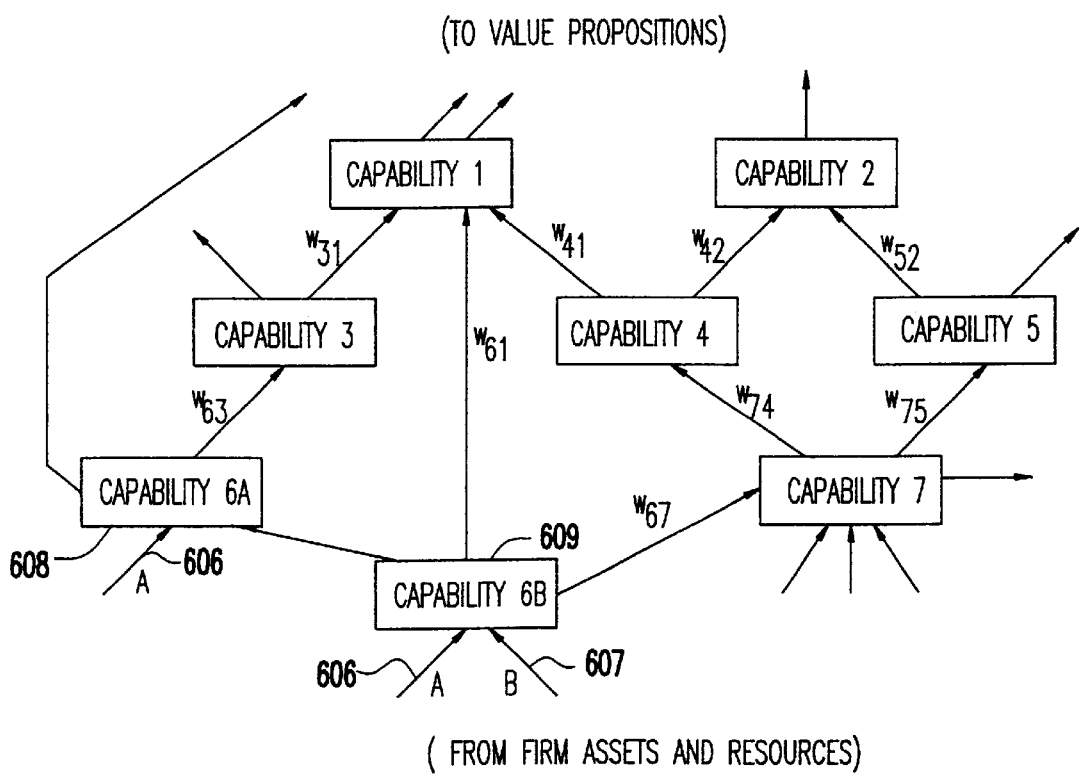

Notice that the inputs to capability 6 ("A" and "B" shown as 606 and 607, respectively) have been split so that, in FIG. 6B, input "A" 606 applies to both capabilities 6A and 6B but input "B" 607 applies only to capability 6B. This need not always be the case. In some cases both of the inputs might be required by both of the split capabilities. In the process of splitting a capability the inputs may be duplicated as needed to support new split capabilities.

The objective of this practice is to provide sufficient detail to a capability such that it has only a single qualitative outcome. The single outcome may provide input to one or more other capabilities and will be shown with multiple output arrows. The important consideration is that each of these outputs are the same. This aids the subsequent evaluation of the effectiveness of these capabilities and their strategic value to the firm. For example, suppose the strategy of the firm is to be a low-price commodity provider. In this case, the strategic value of market data for new product innovation will be substantially less than the strategic value of the capability to forecast market demand. Combining these two capabilities (i.e. market data for new product innovation and market data to forecast market demand) into the original, more general one (i.e. gather market data) will not allow the representation of this strategic difference in value.

Another benefit from this selective detailed representation of capabilities is the identification of specific areas of improvement, as will now be shown with reference to FIG. 7. Taking the example of conflict 700 between the capability to reduce purchase costs by frequently switching suppliers 701 and the capability to build strong supplier relationships 702 cited earlier, FIG. 7a shows the initial capability network. This network allows the identification of the inconsistency in the firm's strategy, but does not provide enough detail. There are two outcomes from the capability to reduce purchase costs. The desirable outcome is, of course, low cost 704 and the undesirable outcome is poor supplier relations reflected by a negative value (not shown) in the support relationship 700 between low purchase costs by constant switching 701 and close supplier relations 702.

This calls for a more detailed modeling of the capability in question, as shown in FIG. 7b by replacing box 701 of FIG. 7a with the contents of box 710. Market price information 711 coupled with short term contracts with suppliers 712 enables constant supplier re-evaluation 713, which in turn enables reduced raw material price 714, thereby supporting low costs 705 as shown in FIG. 7a. The short term contracts with suppliers 712 leads to poor relations, which negatively supports 700 close supplier relations 702 as shown in FIG. 7a. The identification of the more specific underlying capabilities helps determine the means for improvement. In this example, the strategist might identify an alternate way to support the capability to obtain reduced raw material price that does not have the side-effect of poor supplier relations, perhaps as shown in FIG. 7c which shows in box 720 an alternative detailed contents replacing box 701. Market price information 721 supports supplier evaluation 722 so as to enable long term contracts with suppliers 723 which would positively support close supplier relations 702, in contrast to the negative support 700 shown in FIG. 7a. Long term contracts 723 coupled with high volume purchasing 724 enable reduced raw material price 725, which in turn leads to low operating costs 705 as in FIG. 7a.

Types of Capabilities

Capabilities may be categorized based on the nature of their relationships with other capabilities. Such a classification helps in identifying the strategically relevant capabilities of a firm as well as in the subsequent analyses, which are often dependent on the nature of these relationships. There are three general categories of capabilities that could exist in a firm. The first category consists of functional capabilities that perform the primary business functions of the firm. Examples of capabilities described above, such as market analysis, purchasing, and new product development fall into this category.

The second category of capabilities that firms should also possess are coordinating capabilities. This category includes capabilities that represent organizational and managerial routines that are designed to coordinate the outcomes of multiple capabilities, so that another capability can make better use of these outcomes. The modeler of a capability network should look for the existence of these capabilities whenever a capability requires support from others. The network representation of a coordinating capability will depend on the nature of its relationship with the other capabilities. We identify three variations here. When the effectiveness of a capability supported by other capabilities increases due to the presence of a coordinating capability, it can be represented as yet another supporting capability. Just as the other supporting capabilities work to increase the effectiveness of the supported capability, so does the coordinating capability. This situation is represented by the capability network shown in FIG. 8a. The enabling effect on supported capability 805 of supporting capabilities 801, 802 and 803 is enhanced by coordinating capability 804.

Figures 8A, 8B:
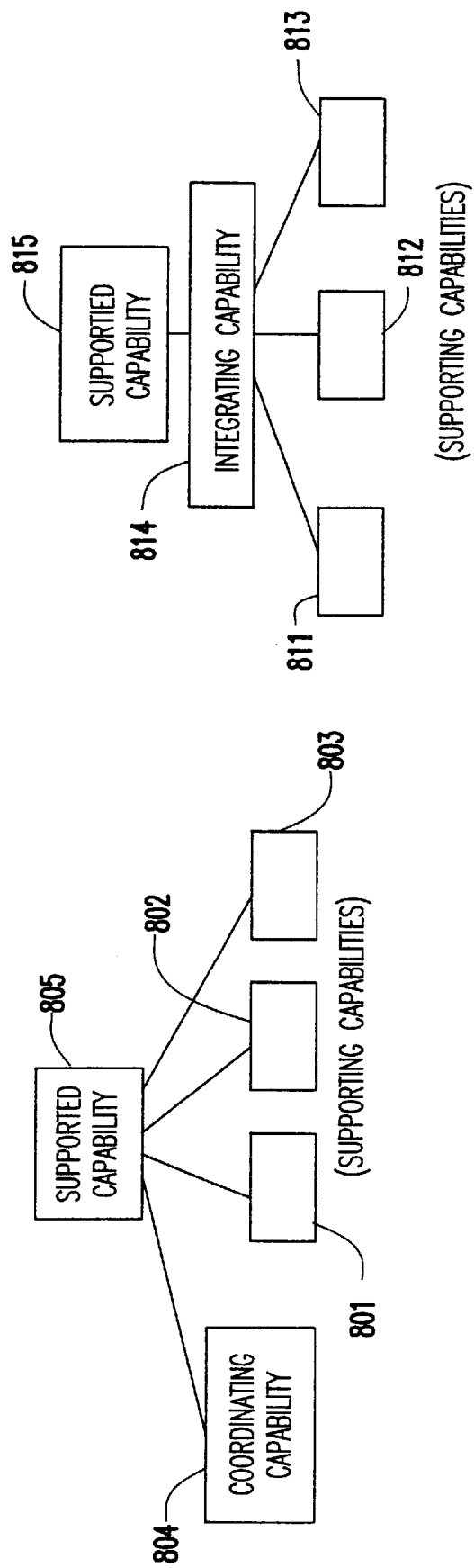
FIGS. 8a is a capability network showing a coordinating capability.
FIG. 8b is a capability network showing a coordinating capability which functions as an integrator.

In other cases, the effectiveness of the supported capability is gated by the coordinating capability. That is, the outcomes of the supporting capabilities are channeled through the coordinating capability, which has the role of an integrator. Without its presence, the supporting capabilities, however effective individually, cannot combine to provide support to a capability. In this case, the coordinating capability occupies a different position in the capability network, as shown in FIG. 8b. Supporting capabilities 811, 812 and 813 enable integrating capability 814 to in turn support capability 815. While not shown in FIGS. 8a and 8b for simplicity, it should be noted that coordinating capability 804 and integrating capability 814, as well as the supporting capabilities which are being coordinated and integrated, respectively, may in turn be supported by some combination of firm assets and resources and other capabilities.

Another variation in the nature of the relationship between the supporting capabilities and their coordinating capability is the presence of synergy between the supporting capabilities. With reference to FIG. 8b, suppose that the effectiveness of the integrating capability 814 is zero if any one of the supporting capabilities 811, 812 or 813 is absent. In other words, the presence of all three capabilities results in a synergism that is exploited by the integrator. For example, the capability to sell online depends on an online database of products, a secure financial transactions handling capability, and a distribution capability. In the absence of any of the enabling capabilities, the capability to sell online disappears. This type of relationship is represented as shown in FIG. 9a. Supporting capabilities 911, 912 and 913 enable supported capability 915 through a relationship represented by synergetic capability 914 and a line 916 tying together the respective supporting vectors from capabilities 911, 912 and 913.

Figure 9B:
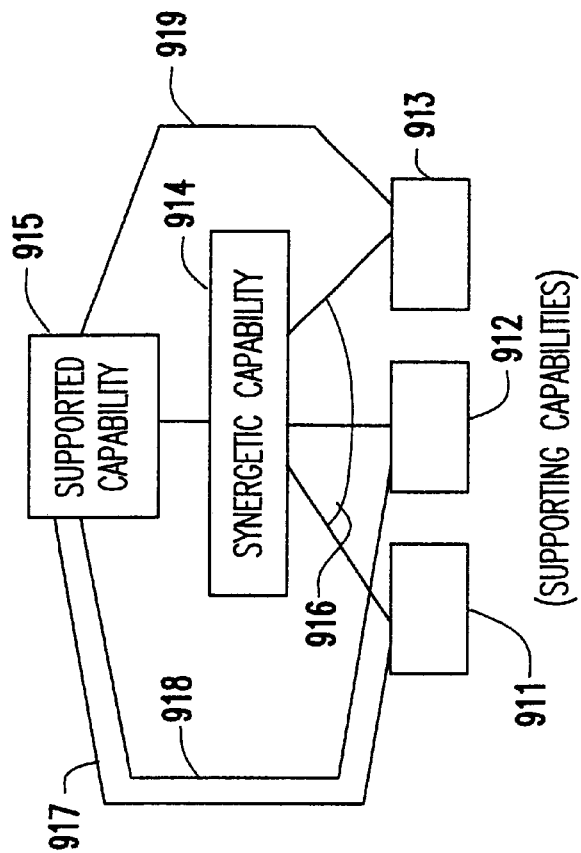
FIG. 9b is a capability network showing supporting capabilities which in addition, if all are present together, provide synergetic support.
Figure 9A:
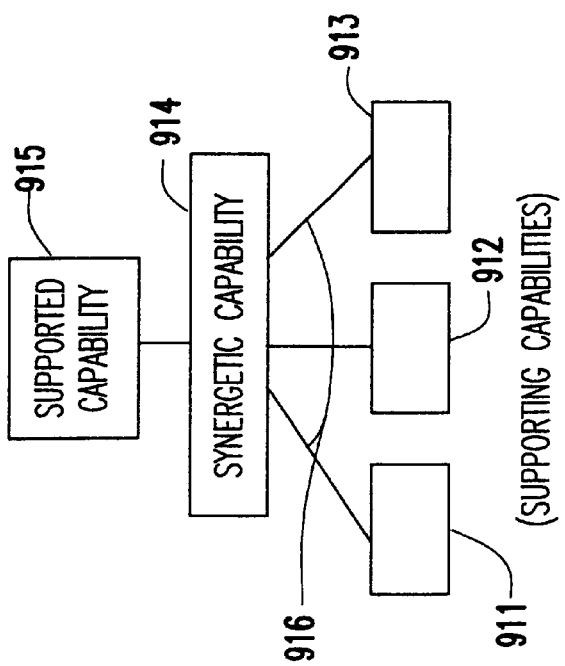
FIG. 9a is a capability network showing synergy which requires the presence of each of several supporting capabilities.

FIG. 9b shows the network when the relationship is not of a strict all-or-nothing nature. Here, the individual supporting capabilities do individually influence the effectiveness of the supported capability, but the simultaneous presence of all three causes an extra boost in the effectiveness. The synergetic capability reflecting this extra boost is represented in the same way as shown in FIG. 9a. But there has been added lines 917, 918 and 919 showing that capabilities 911, 912 and 913, respectively, individually support capability 915.

The strategic significance of representing coordinating capabilities as shown in the above described figures is in determining their value in relation to the value of the supported capability. Without explicitly representing their gating effect between the supported and supporting capabilities, it may be hard to realize their strategic importance and value. When attempting to reduce costs, these capabilities may be the first to go. When designing a new network, these capabilities may be ignored. Often, these are the capabilities that are rare and hard to imitate and, therefore, are the source of sustained competitive advantage in the network. It may also be possible that these "coordinating" capabilities are actually the cause of reduced effectiveness, perhaps when supporting capabilities have been altered to enter the information age. This phenomenon also needs to be represented and strategically understood before changing the implementation of capabilities.

The final category of capabilities are those that improve the effectiveness of other capabilities through learning. Unlike the capabilities in the previous categories, a learning capability does not support the current effectiveness of another capability in a time-independent manner. Instead, the nature of support is to increase the rate at which the capability improves over time, influencing its future effectiveness. This distinction is important for the analyses that can be performed with a capability network. For example, the value of a learning capability is less if it supports a capability whose value is expected to decrease over time. Conversely, a learning capability is valuable even if it supports a capability that provides little value at present, but is expected to be more valuable in a future scenario. Learning capabilities are not distinguished graphically from others in the network. They accumulate learning from the inputs of other capabilities and provide a more valuable input to other capabilities over time.

Capability Network Construction

When constructing a capability network, the modeler has two starting points. The inside-out approach starts from the core capabilities, assuming that these are known. From a given core capability, the modeler needs to identify the capabilities directly supported by it. Support may be either positive (enhancing) or negative (conflicting). Then for each of these capabilities, the same process has to be repeated. As discussed above, a capability identified in a previous step may need to be split into multiple capabilities when it turns out that there are multiple types of outcomes from that capability. This process continues until the capabilities that directly support the firm's value propositions are identified. Next, for each of the capabilities represented so far, their supporting capabilities need to be identified. For any new capability, this process of finding its supporters has to be repeated. This process continues until the tangible firm assets and resources are identified and linked to the capabilities they support. This approach may be suitable for an existing business with known core capabilities, when the objective is to discover new opportunities where they may be utilized to realize value.

The reverse approach starts from the external value propositions that a firm makes or wishes to make. For each of these value propositions, the capabilities needed to support it have to be identified. This process is then repeated for the identified capabilities until the firm assets and resources are identified and linked. During this process too, capabilities need to be split up into the appropriate level of detail when it appears that a capability is supporting multiple types of outcomes. This outside-in approach may be suitable for a new business or when an existing firm has a clear idea of the market it wishes to participate in and wishes to discover the combination of new and existing capabilities it needs in order to enable it to do so.

Resources

Resources, in our framework, ground the cost structure of the entire Strategic Capability Network (SCN). Because they are used with the activities of the firm, we have devised a set of usage based cost drivers that link resources to capability and therefore allow for computation of the relative costs of capabilities.

Relationships: Strategic positions are supported by interrelated networks of capabilities which are in turn supported by resources. The connections in the SCN between resources, capabilities and strategic positions are relationships (links) having the following properties:

They are causal (i.e., directional). This means that a relationship explicitly depicts a source capability or resource causing a change in state, strength, or effectiveness of a target capability or strategic position.

They describe the degree to which one capability influences another, characterized by multiple attributes in qualitative and quantitative form. Some of the qualitative attributes cause a measurable change in the influence that one capability exerts on another. These are mapped to quantities for inclusion into a mathematical function that combines the attributes into a single quantitative measure. The influence might be that the target is made stronger or could not exist at all without the source.

They also describe the degree to which one capability or position utilizes the enabling resource or capability.

They may be uncertain (represented by a probabilistic link strength). Relationships as depicted within this framework are not necessarily completely deterministic or even necessarily observable. They encompass all cause and effect linkages that are observable and all cause and effect linkages that a management team believes to exist.

Relationships can be combined in at least one of the following ways:

Logical and: All of the sources must exist for the target to exist.

Logical or: With any of the sources, the target will exist.

Additive, subtractive, or other functions: A target's state is the combined effect of the supporting sources. These can be accumulated by a variety of functional forms (+, −, min, max, etc.).

Through the process of developing such a network, we are making explicit the tacit understanding of the firm as held by the management team. In general practice, a variety of schemes are used to develop consensus and to align the activities of a firm. Within the SCN framework we expect to integrate the beliefs, expert opinions, and measurable data in a way that aids the formulation and analysis of a firm's strategy.

At this point it is important to note several kinds of insight that we expect these analyses to provide. First, the process of constructing a single network representing the collective understanding of the participating team will identify, and articulate in a common form of expression in accordance with the invention, the areas where individuals hold contradictory or conflicting understanding of their firm's strategy and the ways the strategy is or should be pursued. Second, the results will identify those areas where the current construction of the business is flawed, has deviated from the original intent, or can be improved. Third, the results will identify those areas where the current beliefs of the management team should be tested.

Commentary on the Proposed Framework

We expect that firms will always rely predominantly on the experience and judgment of its people in the development of strategy. Our invention is directed at aiding and enhancing what managers do rather than attempting to replace the people and the human reasoning in the strategic process. Our invention recognizes the difficulties of using past experience in the formulation of future plans. Since the environment continually changes, some past experience can be irrelevant or misleading. Not all members of the management team have the same experiences or the same view of their company and we believe that is desirable. However, we feel that a management team can derive advantage from developing a well understood consensus on what to do while preserving the diversity in experience and viewpoints that comprises its collective understanding of the firm. We refer to the general business literature on various aspects of strategic alignment as proof of that advantage. Our invention provides a framework, notation and procedure for doing this.

In the previous section we highlighted the development of consensus, the identification of design flaws and the isolation of assumptions that should be tested as some of the expected benefits of our framework when put into practice. We believe these benefits are reasonable to expect, because they are noted in the general literature on cognitive mapping in application to other domains. From discussions with practicing consultants during the project to date, we note that these are extremely desirable insights to gain in the view of our clients. Citing again the general business literature on strategic alignment of major business functions, we believe that these insights when communicated across a business team can effect changes within the firm that will result in provable and measurable improvements in business performance.

Analysis Enabled by the SCN Framework

The Strategic Capabilities Network is formulated as a framework for supporting various kinds of strategic analyses. This section describes some of these analyses and their potential value. These descriptions are ordered according to increasing input data requirement and perhaps represent the sequence in which the analyses may be done in a consulting engagement.

Qualitative Network Design Analysis

Once the network of strategic positions, capabilities, and resources have been identified and agreed upon, and formulated in accordance with the invention, certain types of analyses may be done even before gathering the data needed to do the quantitative analyses described later. The degree of alignment or consistency among the capabilities can be analyzed by observing the relations between capabilities and identifying (a) the presence and number of suppressing relationships between capabilities, (b) the presence and number of alternative paths to achieving the strategic positions, (c) the presence and number of circular reinforcing loops in the network, and (d) the detection of sections of the network that are minimally connected or disconnected from other sections. This analysis has the potential for identifying new resources and capabilities that could create new alternate paths or form new reinforcing loops.

Sustainable competitive advantage from a network of capabilities arises only when some of the crucial capabilities are not easily tradable or substitutable. When these are linked to other more easily available capabilities (e.g., IT capabilities), they impart a degree of non-tradability to this sub-network. This forms the next level of analysis: the identification of unique firm capabilities and the analysis of the sustainability of the economic rents being received. This analysis is conditioned by the scenario under which the capabilities operate. A future scenario may reduce or eliminate the need for a non-tradable capability because the strategic position it supports is no longer necessary, valuable, or differentiating, or because the new scenario brings forth substitutes that were previously unfeasible.

The robustness of a capability across multiple scenarios may also be partially analyzed even in the absence of quantitative data. The presence of positive relationships from the capability to the strategic positions desired under multiple scenarios allows the estimation of this robustness. This information could be used to decide which capabilities to invest in even when there is uncertainty over which predicted scenario will eventually come to pass.

Quantitative Network Propagation Analysis

With data characterizing the relationships between strategic positions, capabilities, and resources, it is possible to improve the analyses described above and perform other kinds of analyses. The improvements would arise from utilizing the data representing the strengths of the relationships instead of relying only on the presence or absence of a relationship. The strengths of relationships will be measured where possible, such as the usage or driver based relationships linking resources to capabilities. In other cases, use the elicited opinions of the management team and other expert opinion within the firm.

The indirect linkage of resources to strategic positions allow the distribution of costs and investments in the physical resources, through the capabilities utilizing these resources, to the strategic positions enabled by these capabilities. This can be done by a network cost propagation algorithm we have developed for this purpose. This requires data about the resource and capability drivers analogous to resource and activity drivers for activity-based costing. This analysis allows the determination of the cost for maintaining a capability or a strategic position, taking into account, portions of all the other capabilities and resources that directly or indirectly enable or support it. Even in the absence of other analyses, capability-based costing allows decision makers to evaluate the cost of acquiring, maintaining, and divesting capabilities and strategic positions. While qualitative analysis (and other researchers) call for increasing the consistency by adding redundant paths to the desired capabilities and strategic positions, the increased cost of doing so, if any, may be computed by this approach.

The indirect linkage of strategic positions to resources allow the distribution of the value of a position (in a given scenario), through the capabilities enhancing or suppressing these positions, to the resources enabling these capabilities. This is also done by a network propagation algorithm that takes into account the contributions of a resource or capability to the capabilities and positions affected by it. As a result of this value propagation, it is possible to estimate the strategic value of a capability or a resource. This may be compared to the cost of the capability or resource to determine whether it is beneficial to the firm. The core capabilities, that are indirectly connected to many value bearing strategic positions, will receive value from all these sources making it easy to identify them. Similarly, capabilities that suppress other capabilities or positions will receive negative value from them. This, when added to the positive value the capability received from the other capabilities and positions it supports, will enable the decision on whether to maintain, alter, or divest it.

The cost and value propagation will be affected by the scenario in which it is taking place. This is due to the varying values that value positions will receive in the different scenarios, and is also due to the addition or removal of some capabilities and resources as scenarios change. This longitudinal analysis may lead to the identification of capabilities that must be created or maintained at present even though the cost for doing so is higher than the value they provide today. The identification of capabilities that will be useful in multiple future scenarios is made more reliable when it is based on the estimated value of the capability across these scenarios.

The longitudinal analysis of the value of capabilities across future scenarios leads to the evolution of a strategic plan or architecture. This charts out, based on today's knowledge, what current capabilities are important to today's business and resilient to some or all future scenarios (maintain), what capabilities are needed for some or all futures but not owned today (invest), and what capabilities are valuable today but will be unnecessary in future scenarios (divest). These recommendations form a plan that will need to be reevaluated with time and changes in the environment.

Cost and Value Propagation Algorithms

This section describes the cost and the value propagation algorithms based on a formal definition of the SCN framework. These algorithms form the basis of the various quantitative analyses mentioned in the previous section.

Formal Framework Definitions

A strategic capabilities network consists of the following sets:

1. C is the set of all capabilities in the network.
2. R is the set of all resources in the network.
3. P is the set of all strategic positions in the network.
4. $C_{R_i} \subseteq$ is the set of capabilities that have direct causal relationship from resource $R_i \in R$.
5. $C_{C_i} \subseteq C$ is the set of capabilities that have direct causal relationship from capability $C_i \in C$.
6. $P_{C_i} \subseteq P$ is the set of strategic positions that have direct causal relationship from capability $C_i \in C$.
7. $R'_{C_i} \subseteq R$ is the set of resources that have direct causal relationship to capability $C_i \in C$, such that if $R_j \in R'_{C_i}$ then, $C_i \in C_{R_j}$.
8. $C'_{C_i} \subseteq C$ is the set of capabilities that have direct causal relationship to capability $C_i \in C$, such that if $C_j \in C'_{C_i}$ then, $C_i \in C_{R_j}$.
9. $C'_{P_i} \subseteq C$ is the set of capabilities that have direct causal relationship to strategic position $P_i \in P$, such that if $C_j \in C'_{P_i}$ then, $P_i \in P_{C_j}$.

Figure 10:
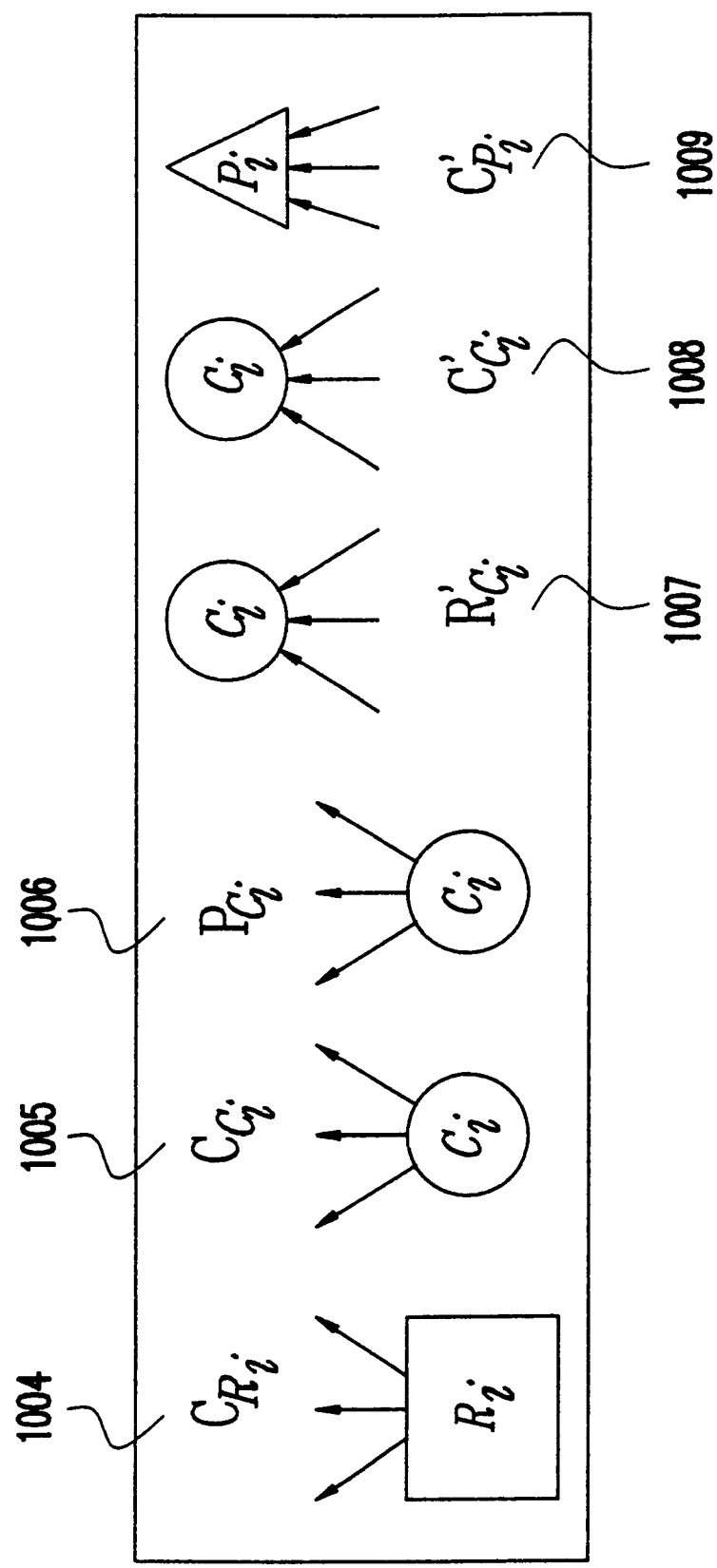
FIG. 10 is a graphical depiction of relationships between capabilities, resources and value attributes in a strategic capability network.

These notations can be graphically depicted as shown in FIG. 10, with the relationship sets described above in definitions 4 through 9 being represented in FIG. 10 by graphical representations 1004 through 1009, respectively.

Sets 1 to 3, above, define the nodes in the network, representing capabilities, resources, and strategic positions. Each of these nodes have attributes that describe the properties of the node. The node attributes necessary for the cost and value propagation algorithms are defined below.

A resource $R_i$ has a capacity $q_{R_i}$ defined in the same units used to define the utilization of the resource by capabilities. For example, if $R_i$ is a computer database server, a suitable dimension would be transactions per second, if that is how the resource is shared among capabilities, instead of the number of MIPS or CPUs.

Figure 11:
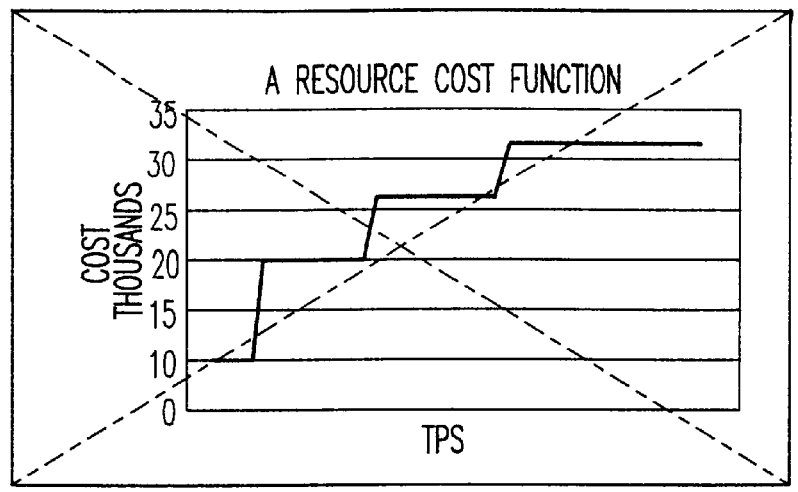
FIG. 11 is a chart showing a resource cost function.

$R_i$ also has a cost associated with it. This is in the form of a cost function, denoted as $c_{R_i}(q_{R_i})$, which indicates that the cost is a function of the capacity of the resource. For the example of a database server, the cost function will include the costs of the content, software licenses, servers, network infrastructure, and the salaries of the support personnel. Some of these components (content, network) have costs that are independent of the number of transactions per second (TPS) while others (servers) may have costs that increase in steps as the number of transactions per second is increased. This results in a cost function similar to that shown in FIG. 11. This example illustrates why it may often be difficult to split resource costs into fixed and variable costs. For this reason, we have adopted the more general formalism of a (possibly discontinuous) cost function. The cost of a resource will be propagated to capabilities and strategic positions using a cost propagation algorithm described later.

A capability $C_i$ has an attribute defining its strength or efficiency which we call effectiveness, denoted as $e_{C_i}$. This may be an absolute or relative measure. For example, the capability to attract people to a store or web-site may be measured in terms of the number of visits per day. The capability to offer low pricing may be measured in terms of percentage points below the industry average. The effectiveness measure is necessary when a capability is enhanced (or suppressed) by multiple capabilities or resources. The degree of this enhancement can be measured in terms of percentage contribution by each contributor to the overall effectiveness of the capability. This information is used in the value propagation algorithm.

A strategic position $P_i$ also has an effectiveness attribute, denoted as $e_{P_i}$. This is defined as the degree to which that strategic position has been achieved and like the effectiveness of a capability, may be an absolute or relative measure. $P_i$ also has a value associated with it. This is the monetary value receivable by the firm as a result of achieving the position $P_i$. The value function, $v_{P_i}(e_{P_i})$ represents the dependence of the value on the effectiveness of the position.

For the sets 4 to 9 defined at the beginning of this section, membership is qualified with attributes that describe the properties of the relationship between an element of a set and its owner. For example, $a_{C_i C_j}$ is an attribute of the relationship between $C_i \in C'_{C_j}$ and $C_j \in C_{C_i}$. The following paragraphs define the relationship attributes necessary for the cost and value propagation algorithms.

Resource drivers define the direct usage or consumption of resources by capabilities. The resource driver $d_{R_i C_j}$ is defined as the fraction of effort made by the resource $R$ in performing activities related to the capability $C_j$, such that, $$\sum_{C_j \in C_{R_i}} d_{R_i C_j} = 1.$$

Capability drivers define the direct usage of capabilities by other capabilities. The capability driver $d_{C_i C_j}$ is defined as the fraction of effort made by the capability $C_i$ in enabling the capability $C_j$, such that, $$\sum_{C_j \in C_{C_i}} d_{C_i C_j} = 1.$$

This driver may be determined from the effort made by activities in $C_i$ explicitly enabling activities in $C_j$. The effort may be measured in terms of time, frequency, or whatever is most appropriate. It is possible for $d_{C_i C_j}$ to be zero. This should be the case when $C_j$ is enabled as a side effect of the activities in $C_i$, which are being performed for some other explicit purpose.

A capability weight defines contribution made by a capability $C_i$ (or resource $R_i$) to the effectiveness of the capability $C_j$. This is represented as a fraction $w_{C_i C_j}$ (or $w_{R_i C_j}$), of the overall effectiveness, $e_{C_j}$ of capability $C_j$, such that $$\sum_{x_i \in [C'_{C_j} \cup R'_{C_j}]} w_{x_i C_j} = 1.$$

Figure 12:
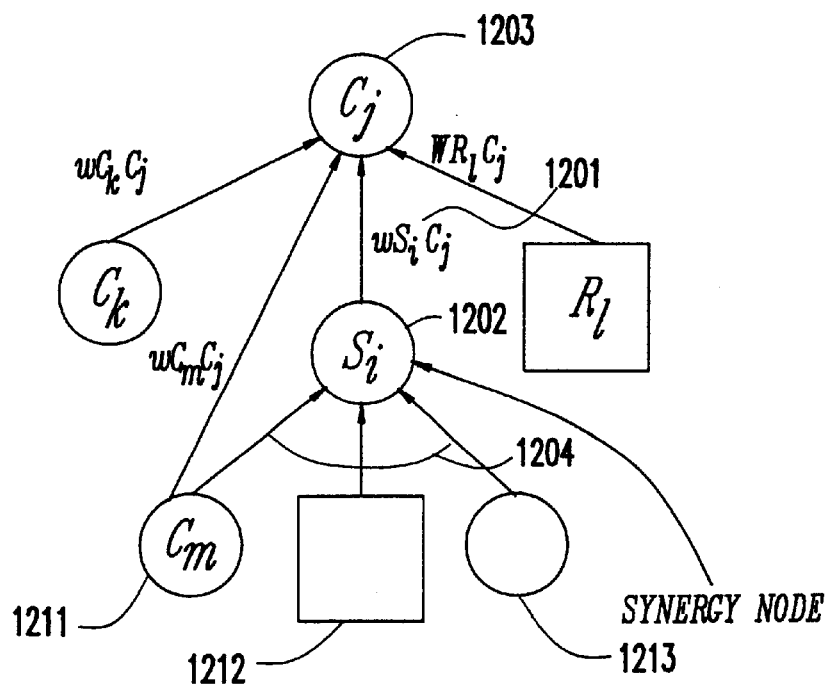
FIG. 12 is capability network showing supporting contribution weights for supporting capabilities, supporting resources, synergy nodes, and capabilities which provide support directly as well as through synergy nodes.

It is often the case that a single capability or resource does not have an independent contribution toward the effectiveness of the capability it supports. For example, the capability to sell online depends on having an online database of products, a secure financial transactions handling capability, and a distribution capability. In the absence of any one of the enabling capabilities (or resources), the capability to sell online disappears. For such a case, as shown in FIG. 12, individual capability contributions are meaningless, and must be replaced by the contribution from the combined set of enabling capabilities or resources. We call such a contribution, a synergetic capability weight, denoted by $w_{S_i C_j}$ 1201, where $S_i$ 1202, is the synergy set of capabilities and resources that contribute synergistically to the effectiveness of the capability $C_j$ 1203. As FIG. 12 shows, $S_i$ 1202 may be considered to be a synergetic capability (of being able to synergistically combine a set of capabilities (1211 and 1213) and resources 1212). Let S be the set of all such synergetic capabilities in the network. A synergetic capability differs from other capabilities in the way it combines the causal links connected to it from other capabilities and resources. These links have no individual weights and are combined as a logical and. This means that the effectiveness of the synergetic capability is zero if any of its enabling capabilities is absent or has an effectiveness of zero. This special relationship among the links coming into a synergetic capability is denoted by an arc 1204 connecting the arrowheads. As shown in FIG. 12, it is possible for a capability, $C_m$ 1211 to contribute to the effectiveness by (a) being part of a synergetic set as well as (b) having an independent contribution. This allows the representation of logical and/or combinations.

The causal links from capabilities to strategic positions also have attributes determining the strategic position weight, $w_{C_iP_j}$ in the same manner as capability contributions. This represents the contribution of the capability C towards the effectiveness of the strategic position $P_j$, represented as a fraction, such that $$\sum_{C_i \in C'_{P_j}} w_{C_iP_j} = 1.$$

Here too, there exists the possibility of synergetic sets of capabilities as described above.

Cost Propagation Algorithm

The formalisms defined above allow us to formulate the propagation of costs from the resources that directly incur them to the capabilities and strategic positions they support. Assuming that the cost of a resource or capability is split in proportion to the resource or capability drivers, the cost of a capability, $cost_{C_i}$ is given by the following equation:

$$c_{C_i} = \sum_{C_j \in C'_{C_i}} d_{C_jC_i} c_{C_j}(C_i) + \sum_{R_k \in R'_{C_i}} d_{R_kC_i} C_{R_k}(q_{R_k}) \quad (1)$$

where, $C_{C_j}(C_i)$ is the cost of $C_j$ less any costs propagated from $C_i$ to $C_j$. This ensures that no double counting takes place in the presence of loops in the network. The first summation includes portions of the cost of the capabilities that directly support $C_i$, the second summation adds the contribution from all the resources that are directly linked to $C_i$.

This cost calculation may also be done by computing the derived resource driver, $d'_{R_kC_i}$ between each resource $R_k$ and capability $C_i$. This derived driver represents the summation of the indirect and direct utilization of $R_k$ by $C_i$. This can be computed by multiplying the drivers along a path $p_a$ from R to C and summing the products over all the paths $p_{R_kC_i}$ from $R_k$ to $C_i$:

$$d'_{R_kC_i} = \sum_{P_a \in P_{R_kC_i}} \prod_{C_j \in P_a} -d_{C_jC'_{j+1}} \quad (2)$$

where, $C_j$ and $C_{j+1}$ are two consecutive nodes in the path $p_a$. Note that a path must not include the same node more than once.

The computation of $d'_{R_kC_i}$ should be done by detecting and eliminating the effects of loops in the network.

With this definition, the cost of a capability may be reformulated as follows:

$$c_{C_i} = \sum_{R_k \in R} d'_{R_kC_i} c_{R_k}(q_{R_k}). \quad (3)$$

This reformulation is useful because it indicates the contribution of each resource to the overall cost of a capability. Also, as described in the next section, it also enables the calculation of the marginal cost of a capability or strategic position.

Similar to the cost of a capability, the cost of a strategic position, $C_{P_i}$ is given by:

$$c_{P_i} = \sum_{C_j \in C_{P_i}} d_{C_jP_i} c_{C_j}. \quad (4)$$

Using derived resource drivers, this can be reformulated as:

$$c_{P_i} = \sum_{R_k \in R} d'_{R_kP_i} c_{R_k}(q_{R_k}). \quad (5)$$

In addition to determining the operating cost of a capability, it is also useful to calculate the marginal cost of a capability. This is the cost of adding or removing a capability, which is not the same as the cost of a capability due to the non-linearity of the cost function $C_{R_k}(q_{R_k})$. For example, consider a resource pool with a fixed cost that is independent of the number of resources and a variable cost that is proportional to the number of resources. In the calculation of the cost of capabilities that use this resource, the fixed cost is distributed among all these capabilities. However, if we wish to determine the cost of adding a new capability that will make use of additional units of this resource, or the cost of removing an existing capability and, along with it, the units of this resource that are now no longer needed, we cannot consider the fixed cost in these marginal cost calculations unless the entire resource pool is added or removed.

Using the derived resource driver notation, the marginal cost $\Delta C_{C_i}$ of a capability is given by:

$$\Delta c_{C_i} = \sum_{R_k \in R} c_{R_k}(q_{R_k}) - c_{R_k}\left((1 - d'_{R_kC_i})q_{R_k}\right). \quad (6)$$

This equation captures the cost for maintaining the portion of $R_k$'s capacity utilized by $C_i$.

Similarly, the marginal cost $\Delta C_{P_i}$ of a strategic position is given by:

$$\Delta c_{P_i} = \sum_{R_k \in R} c_{R_k}(q_{R_k}) - c_{R_k}\left((1 - d'_{R_kP_i})q_{R_k}\right). \quad (7)$$

These equations define the algorithm to be used to propagate costs from resources, through capabilities, to the strategic positions of a company represented by a strategic capability network. Even in the absence of other analyses, capability-based costing allows decision makers to evaluate the cost of acquiring, maintaining, and divesting capabilities and strategic positions.

Value Propagation Algorithm

A firm wishes to achieve a set of strategic positions because of the value it expects to receive from those positions. In this section, we describe an algorithm to propagate the value of a strategic position to the capabilities and resources that contribute, positively or negatively, to its effectiveness. This allows the estimation of the strategic value of resource investments by a firm.

As described before, the source of the value propagation is the value of a strategic position P, given by the value function, $v_{P_i}(e_{P_i})$. This value is propagated to the capabilities $C'_{P_i}$ in proportion to the contributions made by them towards the effectiveness of $P_i$. Capabilities also receive value from other capabilities they are causally linked to. Let $C_j$ be a capability whose value we are interested in calculating. The sets of strategic positions and capabilities from which it will receive value are $P_{C_j}$ and $C_{C_j}$ respectively. Let $v_{C_j}^{out}$ be the value to be distributed out from a capability $C_i \in C_{C_j}$ to its contributing capabilities ($C_j$ being one of them) and resources. This value may be different from the value, $v^{C_iin}$ received by $C_i$ from the positions and capability it contrib utes to. An example of the relationship between the value received and value distributed by a capability may be:

$$v_{C_i}^{out} = v_{C_i}^{in} - \sum_{R_j \in R'_{C_i}} d_{R_j C_i} c_{R_j}(q_{R_j}) \qquad (8)$$

where the direct resource costs for the capability $C_i$ are deducted from the value received in order to come up with the value to be distributed.

We are now in a position to define the equation for the value received by the capability $C_j$:

$$v_{C_j}^{in} = \sum_{P_i \in P_{C_j}} w_{C_j P_i} v_{P_i}(e_{P_i}) + \sum_{C_i \in C_{C_j}} w_{C_j C_i} v_{C_i}^{out}(C_j) \qquad (9)$$

where, $v_{C_i}^{out}(C_j)$ is the portion of $v_{C_i}^{out}$ that does not include any value contributed directly or indirectly by $C_j$. This will avoid double counting of value in the presence of loops. In a similar manner, the value of a resource $R_j$ may be computed from the following equation:

$$v_{R_j} = \sum_{C_i \in C_{R_j}} w_{R_j C_i} v_{C_i}^{out} \qquad (10)$$

When synergetic capabilities are present, the value received by that capability has to be distributed to the capabilities and resources contained in its synergy set. Once distribution policy might be to let each member of the set receive the entire value of the synergetic capability. This may be justified on the basis that the entire value of a synergetic capability will be lost if any one if the members in the synergy set is missing. However, this policy will lead to counting the same value more than once. A possible situation as a result of this may be that each element in the synergy set has a favorable cost/value balance, yet the synergetic capability itself ends up with a cost higher than its value. To avoid these situations, we have adopted the policy of dividing the value evenly among the capabilities and resources in the synergy set. For the synergetic capability $S_i$, this policy results in weights $$w_{C_j S_i} = \frac{1}{|S_i|}$$

for each of the set members $C_j$. These weights are used in the value propagation equations 9 and 10 above, where $S_i$ is treated in the same manner as the other capabilities.

It is also possible to compute the marginal value of a capability or resource. This is the additional value that will be obtained by a firm when it adds a new capability or resource. It is also the reduction in value when a firm removes a capability or resource. The marginal value is not the same as the value because of (a) the potential for nonlinearities in the value function $v_{P_k}(e_{P_k})$ of a position and (b) the presence of synergy sets. The marginal value can be computed using derived weights from capabilities and resources to strategic positions. A derived weight, $w'_{C_i P_k}$ is the fraction of the effectiveness of $P_k$ contributed directly or indirectly by $C_i$. This can be computed by multiplying the weights along a path $p_a$ from $C_i$ to $P_k$ and summing the products over all the paths $p_{C_i P_k}$ from $C_i$ to $P_k$:

$$w'_{C_i P_k} = \sum_{p_a \in p_{C_i P_k}} \prod_{C_j \in p_a} w'_{C_j C_{j+1}} \qquad (11)$$

where, $C_j$ and $C_{j+1}$ are two consecutive nodes in the path $p_a$, where a path must not include the same node more than once and $$w'_{C_j C_{j+1}} = \begin{cases} w_{C_j C_{j+1}} & \text{if } C_{j+1} \in C \\ 1 & \text{if } C_{j+1} \in S. \end{cases} \qquad (12)$$

The assignment of a unit weight when a capability $C_j$ is connected to a synergetic capability $C_{j+1}$ allows the inclusion of the fact that in the absence of $C_j$, $C_{j+1}$ is absent as well.

Once the derived weights of the capability C are known, the marginal value of C is given by:

$$\Delta v_{C_i} = \sum_{P_k \in P} v_{P_k}(e_{P_k}) - v_{P_k}((1 - w'_{C_i P_k})e_{P_k}) \qquad (13)$$

The marginal value of a resource, R may be calculated in a similar manner:

$$\Delta v_{R_i} = \sum_{P_k \in P} v_{P_k}(e_{P_k}) - v_{P_k}((1 - w'_{R_i P_k})e_{P_k}) \qquad (14)$$

These equations compute the strategic value of a resource or capability by propagating the value of a strategic position back to its supporting capabilities and resources. These values, along with the cost, allow the determination of the attractiveness of a capability or resource in a given scenario.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An integrated framework for analyzing a firm, comprising:

a strategic capability network for connecting present resources of said firm through present capabilities of said firm to present value propositions of said firm, said strategic capability network being further comprised of nodes, each said node being a capability, a resource or a strategic position, each said resource having a cost and each said strategic position having a value; and relationships between said nodes, each said relationship being directional and being characterized by a degree of support from a supporting one of said nodes to a supported one of said nodes, said degree of support being dependent upon said present resources, said present capabilities and said present value propositions;

one or more future scenarios used for modifying said strategic capability network, each said future scenario serving to modify said present resources, said present capabilities and said present value propositions.

2. The framework of claim 1, further comprising means for propagating said costs to said supported capabilities and said supported strategic positions.

3. The framework of claim 2, wherein said cost propagating means comprises:

drivers applied to said resource nodes and said capability nodes, each said driver allocating a fraction of said supporting resource or said supporting capability to said respective relationship, and each said driver providing that the sum of said fractions for a said resource or a said capability is equal to one;

a cost propagating algorithm which allocates said costs of said supporting resource or said supporting capability to said supported capability or said supported strategic position in proportion to said drivers.

4. The framework of claim 1, further comprising means for propagating said values to said supporting capabilities and said supporting resources.

5. The framework of claim 4, wherein said value propagating means comprises:

effectiveness weights applied to said strategic position nodes and said capability nodes, each said weight allocating a fraction of an effectiveness of said supported strategic position or said supported capability to said respective relationship, and each said weight providing that the sum of said fractions for a said strategic position or a said capability is equal to one;

a value propagating algorithm which allocates said values of said supported strategic positions or said supported capabilities to said supporting capabilities or said supporting resources in proportion to said weights.

6. A method for analyzing a firm, comprising the steps of:

generating a strategic capability network which connects present resources of said firm through present capabilities of said firm to present value propositions of said firm, said strategic capability network having nodes and relationships between said nodes, each said node being a capability, a resource or a strategic position, each said relationship being directional and being characterized by a degree of support from a supporting one of said nodes to a supported one of said nodes, said degree of support being dependent upon said present resources, said present capabilities and said present value propositions;

modifying said strategic capability network using one or more future scenarios, each said future scenario serving to modify some of said present resources, some of said present capabilities and some of said present value propositions, with consequent effects on said degrees of support;

evaluating how said present resources, said present capabilities and said present value propositions change in light of said future scenarios;

determining from said evaluation which of said present resources, said present capabilities and said present value propositions should be developed, maintained or divested.

7. The method of claim 6, wherein said degrees of support characterizing said respective relationships are related by drivers applied to said resource nodes and said capability nodes, each said driver allocating a fraction of said supporting resource or said supporting capability to said respective relationship, and each said driver providing that the sum of said fractions for a said resource or a said capability is equal to one.

8. The method of claim 7, wherein a cost is associated with each said resource, and said costs are propagated to said supported capabilities and said supported strategic positions in proportion to said drivers.

9. The method of claim 6, wherein said degrees of support characterizing said respective relationships are related by effectiveness weights applied to said capability nodes and said strategic position nodes, each said weight allocating a fraction of an effectiveness of said supported capability or of said supported strategic position to said respective relationship, each said weight providing that the sum of said fractions for said effectiveness of a said capability or a said strategic position is equal to one.

10. The method of claim 9, wherein a value is associated with each said strategic position, and said values are propagated to said supporting capabilities and said supporting resources in proportion to said effectiveness weights.

* * * * *